US 6,539,143 B1

(12) United States Patent
Hunter

(10) Patent No.: US 6,539,143 B1
(45) Date of Patent: Mar. 25, 2003

(54) OPTICAL SWITCHING SYSTEM

(75) Inventor: Scott R. Hunter, Oak Ridge, TN (US)

(73) Assignee: Sarcon Microsystems, Inc., Knoxville, TN (US)

( * ) Notice: Subject to any disclaimer, the term of this patent is extended or adjusted under 35 U.S.C. 154(b) by 134 days.

(21) Appl. No.: 09/628,536

(22) Filed: Jul. 31, 2000

(51) Int. Cl.[7] ............................................... G02B 6/26
(52) U.S. Cl. ........................... 385/19; 385/18; 385/33; 385/20
(58) Field of Search ............................. 385/33, 16–23

(56) References Cited

U.S. PATENT DOCUMENTS

| | | | |
|---|---|---|---|
| 4,204,742 A | * | 5/1980 | Johnson et al. ............... 356/43 |
| 4,753,505 A | | 6/1988 | Mikami et al. |
| 4,844,577 A | | 7/1989 | Ninnis et al. |
| 5,185,824 A | | 2/1993 | Grimes et al. |
| 5,226,099 A | | 7/1993 | Mignardi et al. |
| 5,255,332 A | | 10/1993 | Welch et al. |
| 5,268,974 A | | 12/1993 | Hikita et al. |
| 5,446,811 A | | 8/1995 | Field et al. |
| 5,732,168 A | | 3/1998 | Donald |
| 5,796,886 A | | 8/1998 | Hong et al. |
| 5,844,238 A | | 12/1998 | Sauer et al. |
| 5,848,206 A | | 12/1998 | Labeye et al. |
| 5,923,798 A | | 7/1999 | Aksyuk et al. |
| 5,962,949 A | | 10/1999 | Dhuler et al. |
| 6,023,121 A | | 2/2000 | Dhuler et al. |
| 6,049,641 A | | 4/2000 | Deacon et al. |
| 6,192,171 B1 | * | 2/2001 | Goodman et al. ............. 385/16 |

FOREIGN PATENT DOCUMENTS

| JP | 59028132 A | 2/1984 |
|---|---|---|
| JP | 62044711 A | 2/1987 |

* cited by examiner

Primary Examiner—Hung N. Ngo
(74) Attorney, Agent, or Firm—Luedeka, Neely & Graham, P.C.

(57) ABSTRACT

An optical switching device routes optical signals, completely within optical media, from an arbitrary number of N input optical fibers to a different set of M output optical fibers. The switching device uses a thermal microcantilever bimorph optical switch to redirect optical radiation emitted by a laser light source, or from the end of an optical fiber, to an input end of another optical fiber. The modulated optical radiation containing signals from the input fiber optic bundle or laser light source is collimated into parallel beams and projected in free space across the tops of an array of the microcantilever bimorph optical switches. When selected, a particular switch is activated, pops up, intercepts, and reflects the optical radiation down into a cavity and then into a short section of parallel waveguide. The radiation is directed into a transverse waveguide and then to an output optical coupler. This radiation is then coupled into the selected output optical fiber.

32 Claims, 13 Drawing Sheets

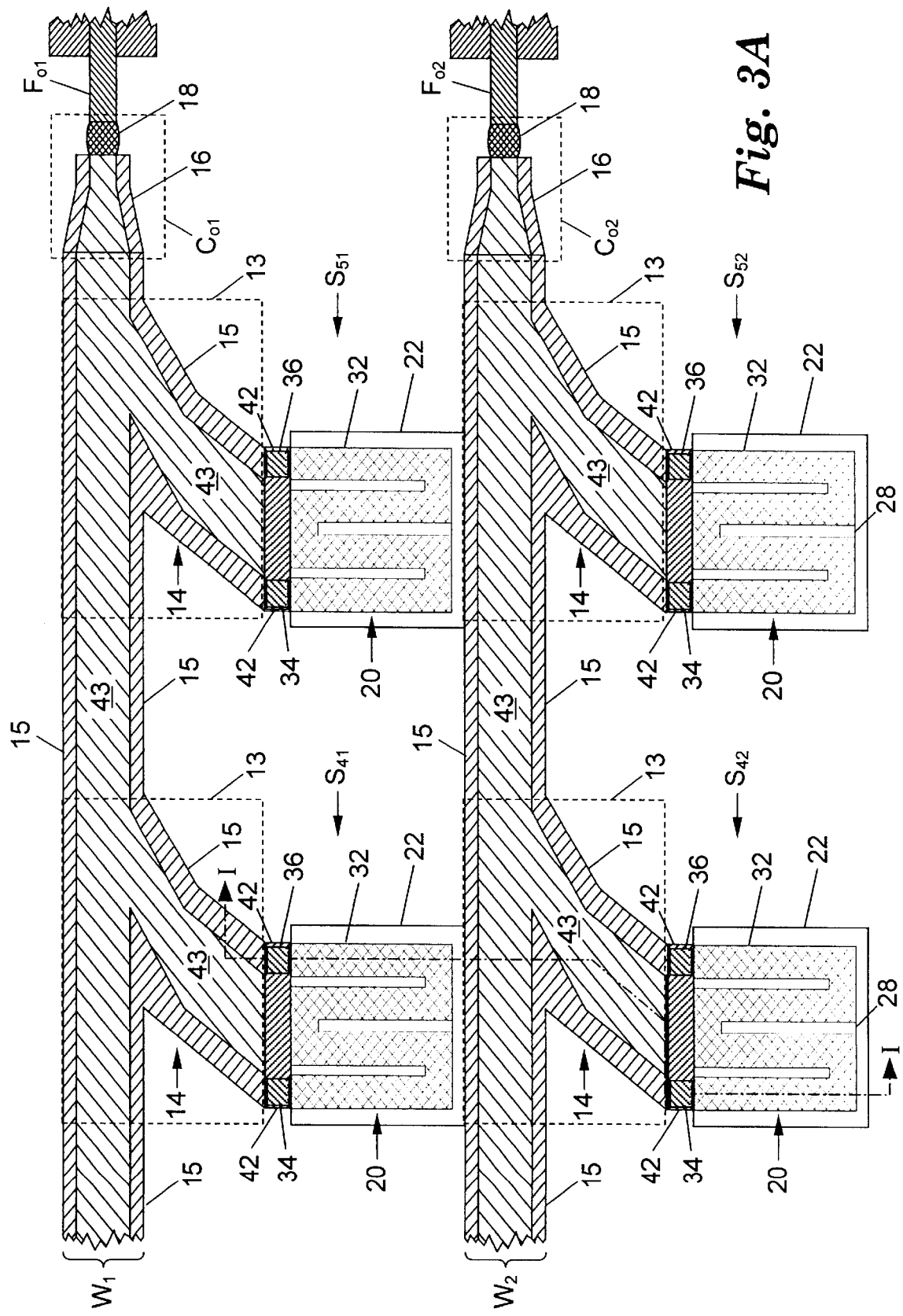

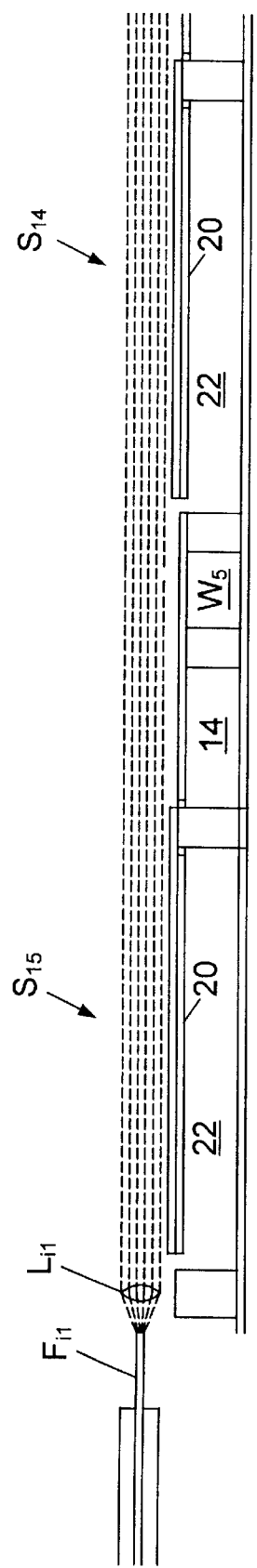
Fig. 5A (section II-II)
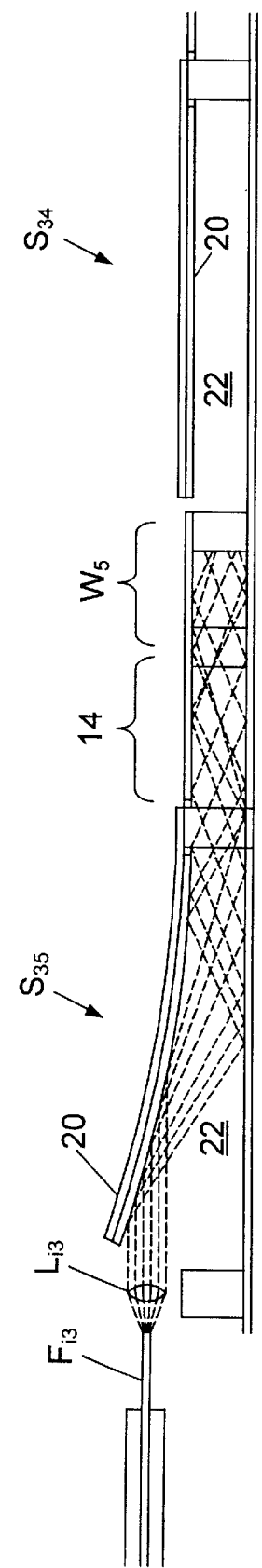
Fig. 5B (section III-III)

OPTICAL SWITCHING SYSTEM

TECHNICAL FIELD

The present invention relates generally to a thermally-activated bimorph optical switching element. More particularly, the invention relates to an optical switching system for fiber optic cross connect and add-drop multiplexers in wavelength division multiplexing systems.

BACKGROUND OF THE INVENTION

The growth of the Internet and the World Wide Web has created a demand for large data bandwidths and high-speed channel switching within the telecommunications industry. Traditionally, telecommunications and other data transfer signals have been exchanged electrically via electrically-conductive wires and cables. Increased bandwidth requirements have led to the adoption of optical signal transfer via fiber optic cables. Optical fiber communications were originally developed for large bandwidth applications, such as long distance trunk cables connecting local metropolitan telephone exchanges. As the cost of these fiber optic networks has decreased and the demand for signal bandwidth increased, fiber optic communications networks are being installed in local metropolitan area networks, and as parts of local area networks (LANS) for data exchange between computers in offices and other commercial and government environments.

Crucial elements in these fiber optic communications networks are the switches and routers that direct the optical signals from various sources to any one of a multitude of destinations. Such switches can be used in a variety of applications, including N×N cross-connect switches for switching signals between arrays of input and output optical fibers, add-drop multiplexers in wavelength-division-multiplexing (WDM) and the more recent dense-wavelength-division-multiplexing (DWDM) systems, reconfigurable networks, and hot backups for vulnerable components and systems. These and other similar applications require switches with moderate switching speeds of one millisecond or less, low insertion loss, low noise, low dispersion, and low cross talk. Additional needs are for low cost, small form factor, easily manufacturable components to facilitate the rapid adoption of these technologies in wider arrays of optical switching applications.

Many switching techniques have been developed to facilitate the generation and transfer of these optical signals in fiber optic networks. Initially, to switch signals between various arrays of optical fibers, the optical signals had to be converted to electrical signals, conditioned, amplified, and routed to laser light sources and modulators before being retransmitted to the output optical fiber. Electrical switching schemes are undesirable in these applications due to the reduced bandwidth, increased noise, and added cost and complexity of the resulting system designs. As a result, several all-optical switching schemes have been developed, or are under development, for use in telecommunications and data transfer networks, but all of these designs have limitations in these applications.

What is needed, therefore, is a reliable, low-cost, high-bandwidth, low-loss optical switching system.

SUMMARY OF THE INVENTION

The foregoing and other needs are met by a device for switching optical signals, completely within optical media, from an arbitrary number of N input optical fibers to a different set of M output optical fibers. The invention uses a thermal bimorph optical switch to redirect optical radiation emitted by a laser light source, or the end of an optical fiber, to an input end of another optical fiber. The modulated optical radiation containing signals from the input fiber optic bundle or laser light source is collimated into parallel beams and projected in free space across the tops of an array of microcantilever bimorph optical switches. When selected, a particular switch is activated, pops up, intercepts, and reflects the optical radiation down into a cavity and then into a short section of parallel waveguide. The radiation is directed into a transverse waveguide and then to the output optical coupler. This radiation is then coupled into the selected output optical fiber.

The microcantilever (or bimorph) optical switch is composed of two or more thin film layers that possess large differences in their thermal expansion coefficients. When heated, the difference in thermal expansion of the two layers induces a surface stress on the cantilever structure, causing it to bend to null the resultant stress. The bending of the cantilever structure causes the free end of the cantilever to move to intercept the optical radiation emitted by the laser light source or optical fiber.

The bottom layer of the bimorph switch is fabricated from a metal that is highly reflective at the wavelength of the optical radiation, and that possesses a large thermal expansion coefficient. A thin dielectric electrically-insulating middle layer is usually added to the structure to electrically isolate the bottom layer from the top layer. The upper layer is fabricated from a low thermal expansion, doped semiconductor material, which is patterned and doped to create a resistive heater that is used to uniformly heat the bimorph structure.

When a switch is selected, an electrical current passes through the resistive heater, thereby heating the bimorph structure. When the structure is heated, the free end of the cantilever structure rises and intercepts the beam. The optical radiation is reflected by the metal surface into the free space cavity, through a transparent window, and into the waveguide material. The optical radiation is directed into a short length of coupling waveguide structure, and turned approximately 90° into a Y coupler and directed into another waveguide structure approximately at 90° to the original direction of beam propagation. The waveguides are then coupled into another set of output optical fibers.

The optical switch of the present invention offers the following benefits: (1) high speed switching with thermal time constants of less than 1 millisecond, (2) true N×M non-blocking switching operation, (3) scalability to large switch arrays where N and M may be several hundred to a thousand switch array dimensions, (4) true digital switching operation; i.e. on/off with no precise control of switch paddle position required, (5) in-plane switch construction with resultant ease of alignment, (6) low insertion losses and cross talk, (7) small physical size, and (8) low cost fabrication due to complete silicon integrated circuit compatibility.

In one aspect, the invention provides an optical switch for selectively transferring optical radiation from a first optical path to a second optical path. The switch includes an input optical structure for receiving the optical radiation from the first optical path and for directing the optical radiation along a propagation path. The switch also includes a paddle disposed adjacent the propagation path. The paddle has a fixed portion and a free end, and is operable to bend upon a change in temperature, thereby moving the free end between a first position where the free end does not intercept the optical radiation and a second position where the free end intercepts and redirects the optical radiation. The switch further includes an output optical structure for receiving the optical radiation from the paddle and for directing the optical radiation along the second optical path.

In another aspect, the invention provides an optical switching device for selectively transferring at least one optical signal from at least one optical input to M number of output optical channels. The switching device includes an input optical structure for receiving the optical signal from the optical input and for directing the optical signal along a propagation path. The switching device also includes a 1×M-dimensional array of optical switches. The 1×M-dimensional arrays have M number of selectively-activated paddles that are adjacent to and in parallel with the propagation path. Each of the paddles has a fixed portion and a free end, and is operable to bend upon a change in temperature, thereby moving the free end between a first position where the free end does not intercept the optical signal and a second position where the free end intercepts the optical signal. One paddle at a time is selectively activated to bend, intercept the optical signal, and redirect the optical signal. The switching device further includes M number of output optical structures, each optically coupled to a corresponding one of the M number of paddles. Each of the output optical structures receives an optical signal from a corresponding one of the paddles and directs the optical signal along a corresponding one of the M number of output optical channels.

BRIEF DESCRIPTION OF THE DRAWINGS

Further advantages of the invention will become apparent by reference to the detailed description of preferred embodiments when considered in conjunction with the drawings, which are not to scale, wherein like reference characters designate like or similar elements throughout the several drawings as follows:

FIG. 3A depicts a portion of the optical switching device according to a preferred embodiment of the invention;

FIGS. 5A and 5B are cross-sectional views indicating the operation of the bimorph optical switches according to a preferred embodiment of the invention;

DETAILED DESCRIPTION OF THE PREFERRED EMBODIMENT

Figure 1A:
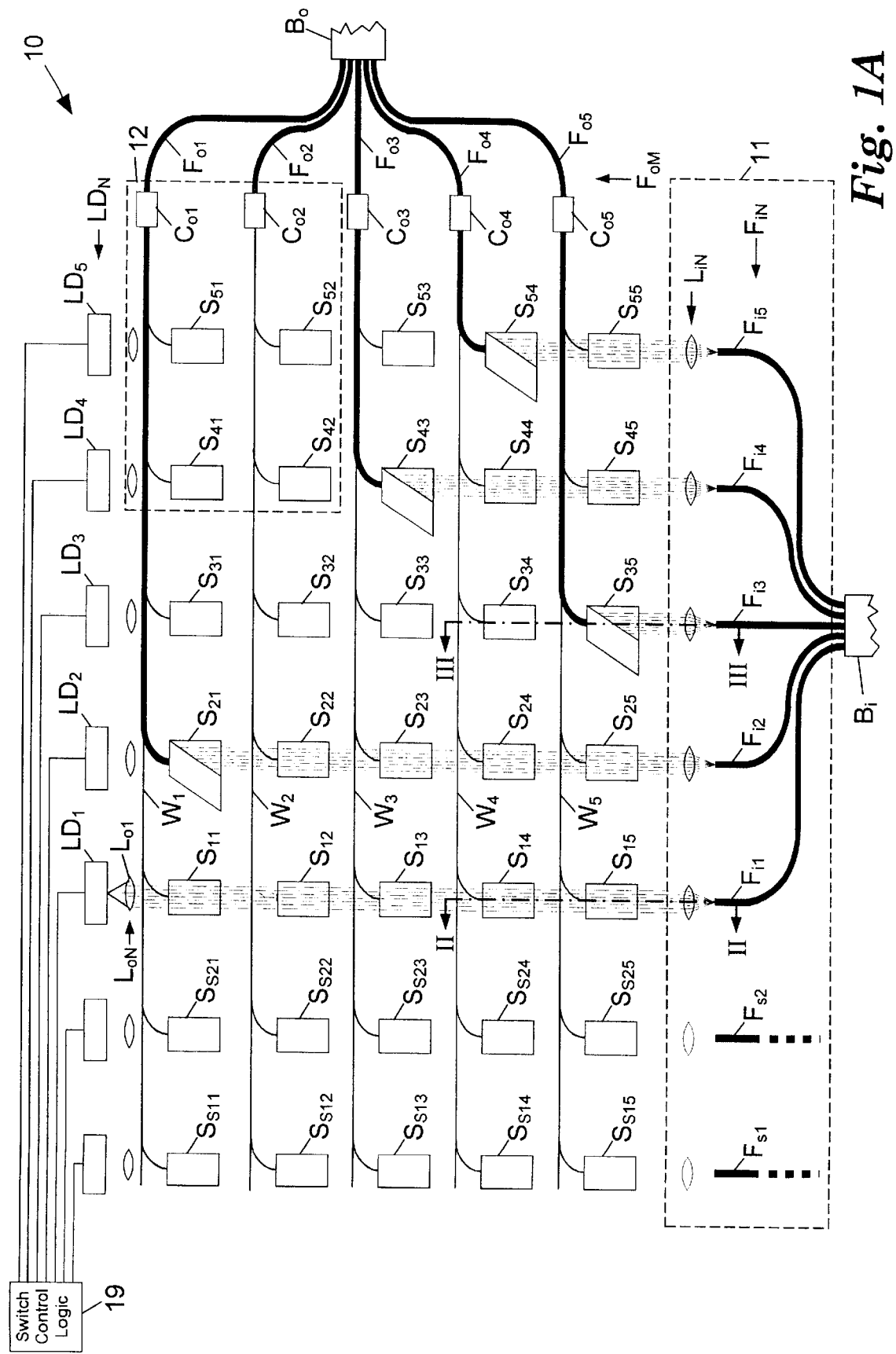
FIGS. 1A and 1B depict an optical switching device according to preferred embodiments of the invention.

FIG. 1A depicts a cross-connect optical switching device 10 for switching input signals from N number of input optical fibers $F_{iN}$ to M number of output optical fibers $F_{oM}$. In the example depicted in FIG. 1A, there are five input fibers $F_{i1}$–$F_{i5}$(N=5) and five output fibers $F_{o1}$–$F_{o5}$(M=5). However, it should be appreciated that the invention is not limited to any particular number of input or output channels. The input signals, which may be telephone or data signals in a telecommunication network, generally consist of modulated optical radiation. The input signals radiate from the ends of the input fibers $F_i$ and are captured by beam-collimating optics, such as lenses $L_{iN}$. The lenses $L_{iN}$ collimate the input optical signals into N number of parallel beams of light, each of which is projected in free space over M number of microcantilever optical switches. The input fibers $F_{iN}$ and the lenses $L_{iN}$ comprise one embodiment of an input optical structure 11.

As shown in FIG. 1A, optical switches $S_{11}$–$S_{15}$ are aligned in a column parallel to the beam emitted from the lens $L_{i1}$, the switches $S_{21}$–$S_{25}$ are aligned in a column parallel to the beam emitted from the lens $L_{i2}$, and so forth. As described in more detail hereinafter, when a particular one of the switches $S_{11}$–$S_{55}$ is selected, it pops up, intercepts the corresponding beam, and reflects the optical radiation downward. The reflected radiation enters an optical cavity beneath the selected switch, and then travels into a short section of waveguide that is parallel to the direction of travel of the projected beam. The radiation is then turned, preferably by 90°, and directed into a transverse waveguide corresponding to the selected switch. There are M number of transverse waveguides $W_1$–$W_5$ corresponding to the M number of output fibers $F_1$–$F_5$. The optical radiation in the selected one of the transverse waveguides $W_1$–$W_5$ is coupled to a corresponding one of the output fibers $F_1$–$F_5$ through a corresponding one of M number of output optical couplers $C_{o1}$–$C_{o5}$.

In the example of FIG. 1A, switches $S_{21}$, $S_{35}$, $S_{43}$, and $S_{54}$ are selected to route input optical signals from input fiber $F_{i2}$ to output fiber $F_{o1}$, $F_{i3}$ to $F_{o5}$, $F_{i4}$ to $F_{o3}$, and $F_{i5}$ to $F_{o4}$, respectively.

Thus, each column of switches, such as $S_{11}$–$S_{15}$, forms a 1×M-dimensional array which is capable of routing any one of the N number of input signals to any one of the M number of transverse waveguides and output fibers, completely in optical media. Since there is no need to convert the input signals from an optical format to an electrical format to accomplish the switching, there is little or no loss in bandwidth. Further, the switching system 10 introduces much less insertion loss than would be introduced by a system that requires conversion from optical to electrical to optical formats. Other advantages of the invention will be obvious as further details of the system 10 are described below.

With continued reference to FIG. 1A, the preferred embodiment of the invention includes a set of output lenses $L_{oN}$ that are disposed on the opposite side of the array of switches from the input fibers $F_{iN}$. If no switch is selected in a given column of the array, then the optical beam from the input lens $L_{iN}$ corresponding to that column is incident upon the corresponding output lens $L_{oN}$. For example, as shown in FIG. 1A, the optical beam from the input fiber $F_{i1}$ and lens $L_{i1}$ is not intercepted by any of the switches $S_{11}$–$S_{15}$, and is incident upon the output lens $L_{o1}$. The lens $L_{o1}$ focuses the beam onto an optical light detector $LD_1$ which converts the optical signal into an electrical signal. The electrical signal from the detector $LD_1$ is provided to a switch control logic unit 19.

Generally, the modulated optical signals carried by the input fibers $F_{i1}$–$F_{iN}$ include header information indicating the source and the intended final destination of the information carried by the optical signals. Before any switch in a column of an array is activated, the switch control logic unit 19 receives and decodes the header information in the optical beam, and determines which switch in the column should be activated to send the signal to the appropriate output fiber $F_{oM}$ to carry the signal to its final destination. Based on the header information, the switch control logic unit 19 generates a switching signal that is used in selecting the appropriate switch in the array. Preferably, after a particular packet of information has been routed through to the appropriate output fiber $F_{oM}$ by selection of one of the switches $S_{NM}$, the selected switch is deactivated, and the optical beam is again provided to the corresponding one of the detectors $LD_N$ so that the header information in the next information packet may be processed.

As shown in FIG. 1A, the preferred embodiment of the switching device 10 includes a number of spare switches $S_{11}$–$S_{25}$ that may be used in the event that any of the switches $S_{11}$–$S_{55}$ fail. For example, if any of the switches $S_{11}$–$S_{15}$ were to fail, the input signals on input fiber $F_{i1}$ could be rerouted to the spare fiber $F_{s1}$, and the spare switches $S_{11}$–$S_{15}$ would be used in place of the switches $S_{11}$–$S_{15}$.

Figure 1B:
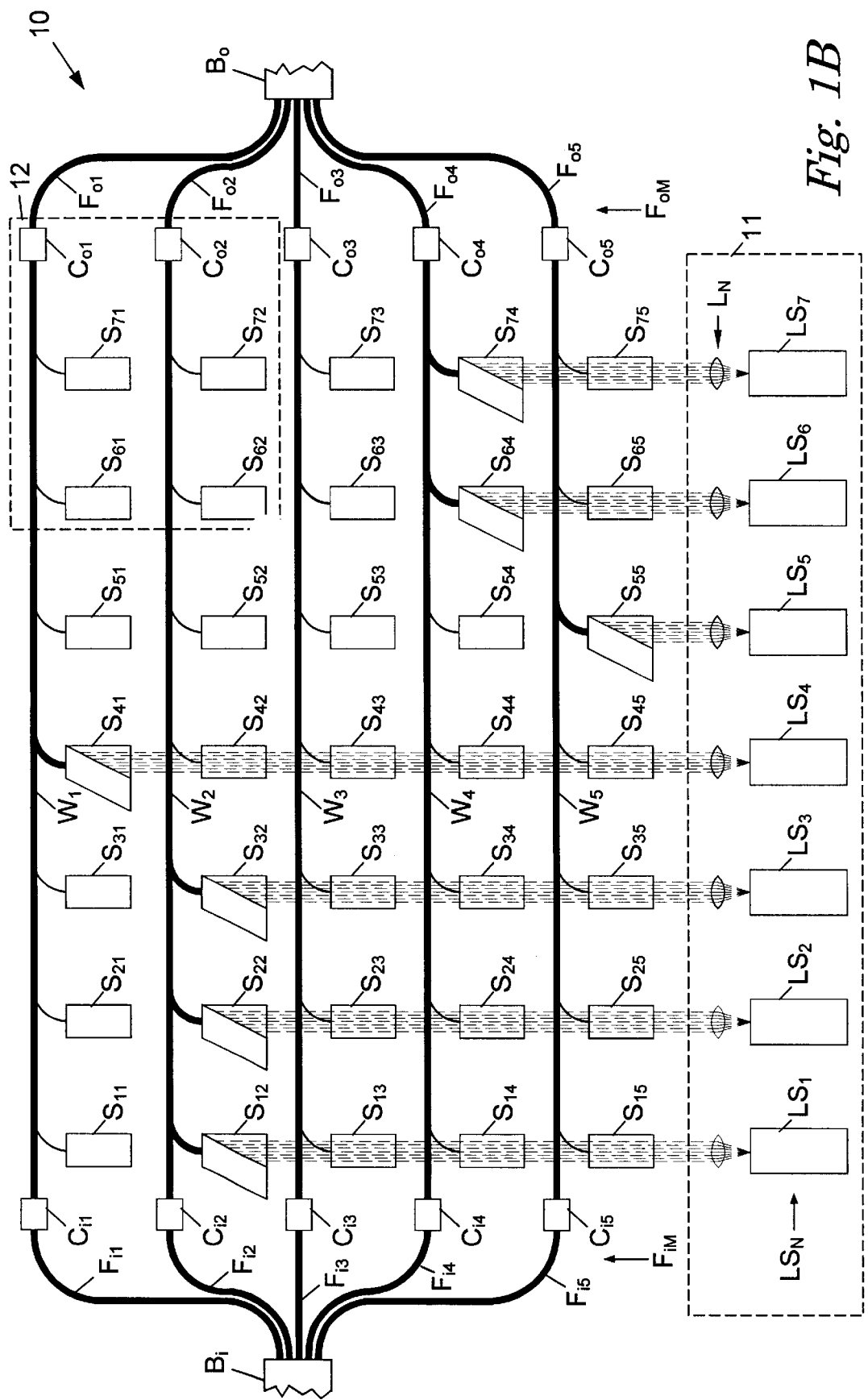

An alternate embodiment of the optical switching system 10 is depicted in FIG. 1B. In this embodiment, the two-dimensional array of switches $S_{11}$–$S_{75}$(N=7, M=5) selectively switch in and combine optical signals from N number of light sources $LS_N$, such as laser or light-emitting diode light sources, with input signals on input optic fibers $F_{iM}$. This embodiment may be used to combine optical signals having various different wavelengths on a single one of the output optic fibers $F_{oM}$, or adding extra signal channels in time division multiplexing (TDM). For example, as depicted in FIG. 1B, the signals from laser sources $LS_1$, $LS_2$, and $LS_3$ are combined in the transverse waveguide $W_2$ by activating switches $S_{12}$, $S_{22}$, and $S_{32}$. As shown in FIG. 1B, the transverse waveguides $W_1$–$W_5$ are coupled to the input fibers $F_{i1}$–$F_{i5}$ via the input fiber-optic-to-waveguide couplers $C_{i1}$–$C_{i5}$, and are coupled to the output fibers $F_{o1}$–$F_{o5}$ via the output fiber-optic-to-waveguide couplers $C_{o1}$–$C_{o5}$. Preferably, the selection, activation, and operation of the switching array of FIG. 1B works in substantially the same manner as the switching array of FIG. 1A.

The system 10 of FIGS. 1A and 1B can be operated in a number of switching modes. The optical radiation can be redirected from N number of input optical fibers $F_{iN}$ (FIG. 1A) or input lasers light sources $LS_N$ (FIG. 1B) to an equivalent number of output optical fibers $F_{oN}$ (M=N) in an arbitrary fashion to form an N×N switch. Alternatively, the signals from N number of input optical fibers $F_{iN}$ (or input laser light sources $LS_N$) can all be directed into a single output fiber (M=1) to form an N×1 switch. In yet another configuration, the radiation from two or more input optical fibers $F_{iN}$ (or input laser light sources $LS_N$) can be combined in an arbitrary fashion to produce an output array with up to N operational output optical fibers $F_{oN}$ (an N×M switch). Thus, N and M may be any number, and are completely independent.

Figure 2:
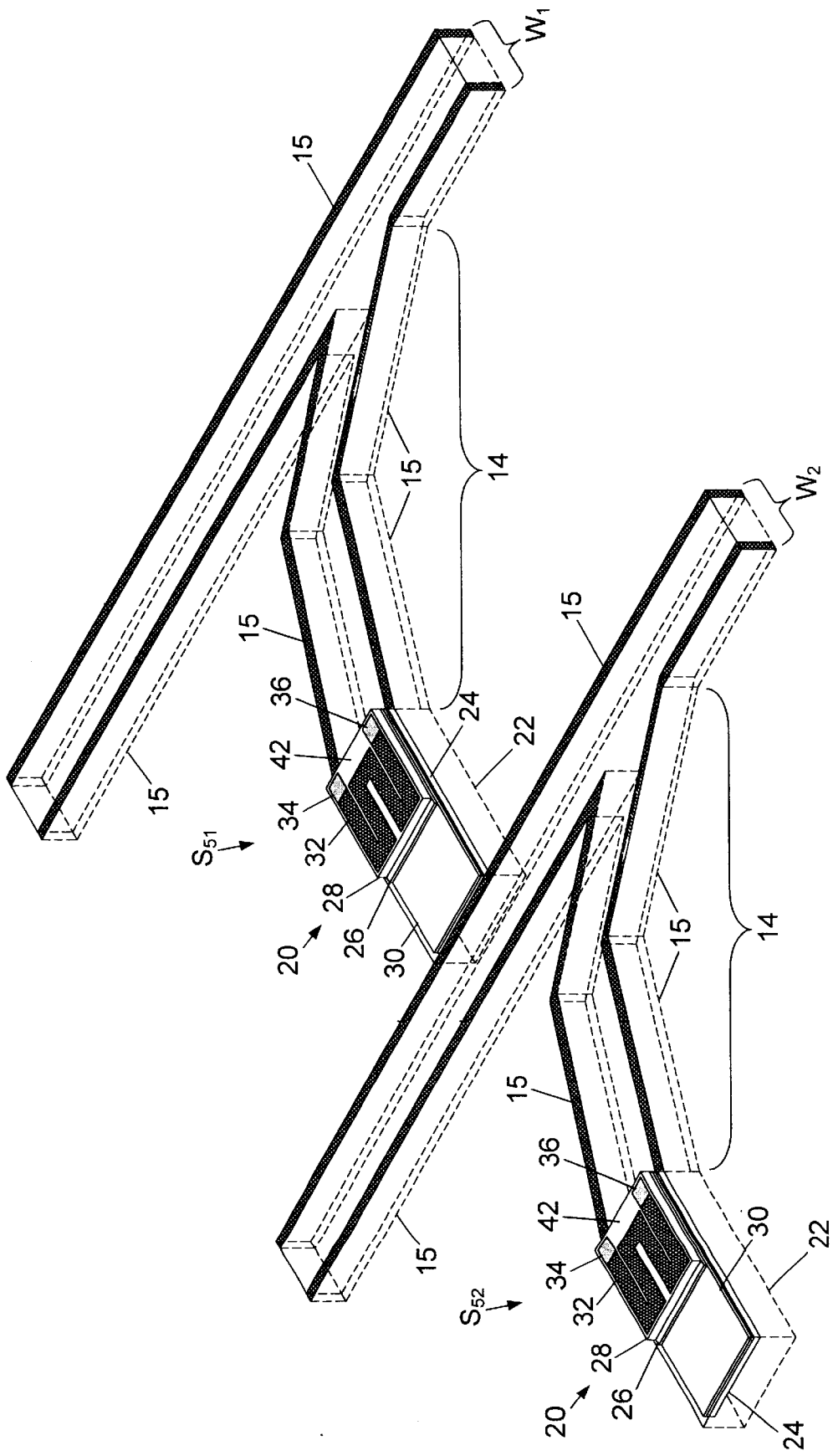
FIG. 2 is an isometric view of a portion of the optical switching device according to a preferred embodiment of the invention.
Figure 3B:
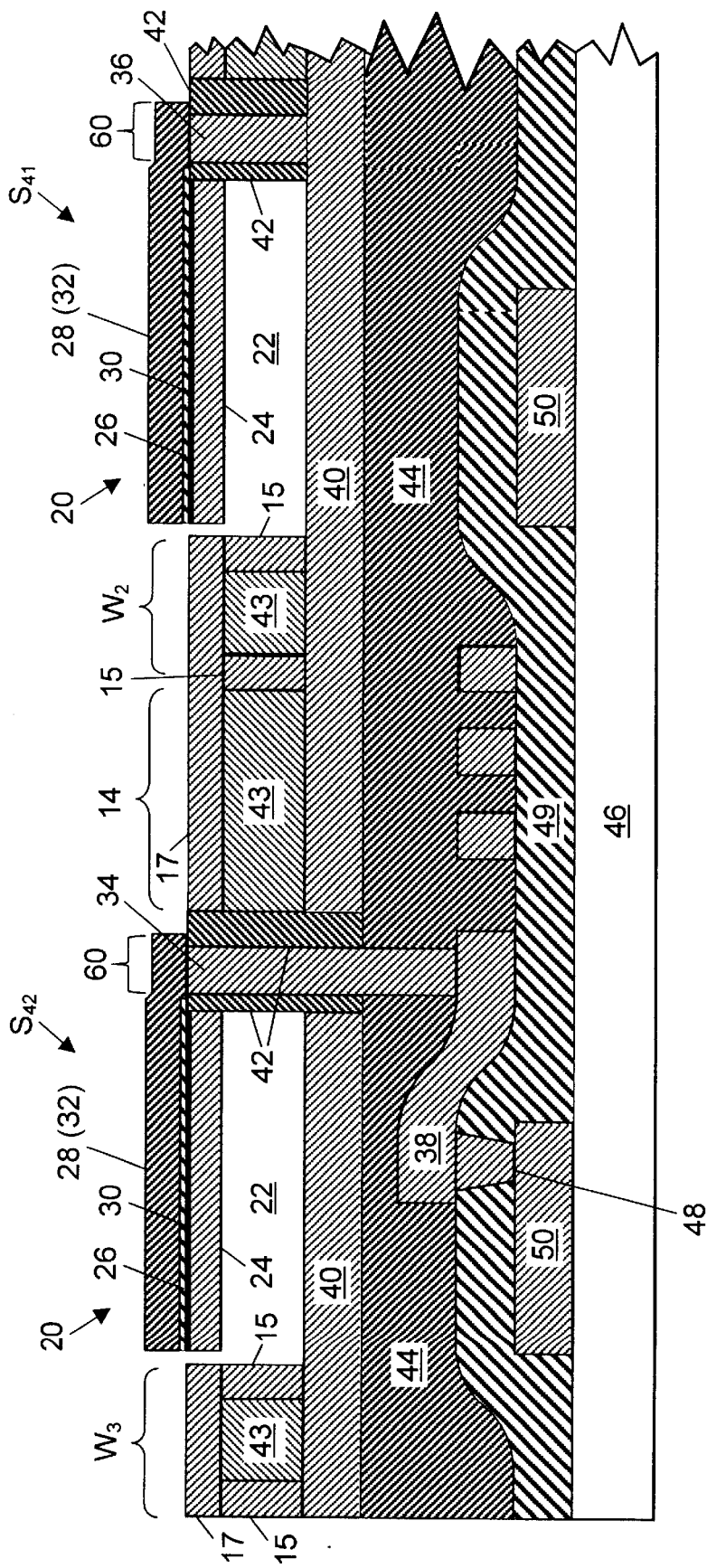
FIG. 3B is cross-sectional view of bimorph optical switches according to a preferred embodiment of the invention.

FIGS. 2, 3A, and 3B depict portions of the switching system 10 in more detail. FIG. 2 is an isometric view of the switches $S_{51}$ and $S_{52}$ and interior portions of their associated waveguide structures. FIG. 3A depicts a section of the switching system 10 as indicated by the dashed outline 12 in FIGS. 1A and 1B. FIG. 3B depicts a cross-sectional view through a pair of the switches, $S_{41}$ and $S_{42}$, corresponding to the section line I—I of FIG. 3A. As shown in FIGS. 2, 3A and 3B, each transverse waveguide, such as $W_1$, is coupled to the switches, such as $S_{41}$ and $S_{51}$, by a Y-coupler 14. For example, the Y-coupler 14 turns the optical radiation from the switch $S_{51}$ by 90° and directs the radiation into the transverse guide $W_1$. The Y-couplers 14 and transverse waveguides $W_M$ comprise an output optical structure 13. As described in more detail below, the Y-couplers 14 and the transverse waveguides $W_1$–$W_5$ are preferably formed from an optically-transparent thermal oxide layer 43, such as $SiO_2$. The walls 15 of the Y-couplers 14 and the transverse waveguides $W_M$ are formed from optically-reflective metal, such as Al, Au, Pb, or Zn. Alternatively, the walls 15 may be formed from a material having an index of refraction different than that of the oxide layer 43 in the interior of the Y-couplers 14 and the transverse waveguides $W_M$.

As shown in FIG. 3A, optical radiation travelling in a transverse guide, such as $W_1$, is coupled to an output fiber, such as $F_{o1}$, through an output coupler, such as $C_{o1}$. Each of output couplers $C_{o1}$–$C_{o5}$ preferably include a tapered waveguide section 16 and a refractive index matching section 18. The refractive index matching section 18 preferably consists of a gel or epoxy for matching the index of refraction of the transverse guide $W_1$ to the index of refraction of the output fiber $F_{o1}$.

As depicted in FIGS. 2, 3A and 3B, each switch $S_{NM}$ includes a cantilevered paddle 20 having a fixed portion 60 attached to the waveguide structures and a free end extending over an optical cavity 22. The paddle section 20 is 50–500 microns in length, 20–200 microns in width, and composed of three primary layers: a lower layer 24, a middle layer 26, and an upper layer 28. The lower paddle layer 24 is metal that is highly reflective at the wavelength of the optical radiation, and which possesses a large coefficient of thermal expansion, such as Al, Au, Pb, or Zn. The middle paddle layer 26 is a thin electrically-insulating dielectric layer for electrically isolating the lower layer 24 from the upper paddle layer 28. Preferably, the middle layer 26 is composed of $SiO_2$, SiC, $Si_3N_4$, $Si_xO_yN_z$ or $H_xSi_yC_z$. In the preferred embodiment, a very thin bonding layer 30, such as Cr, Ti, TiW, TiN, or nichrome, is used to bond the lower metal layer 24 to the middle insulating layer 26.

The upper paddle layer 28 is fabricated from a semiconductor material having a low coefficient of thermal expansion, such as doped polysilicon. This upper paddle layer 28 is patterned, preferably in a serpentine shape, and doped to somewhat increase its electrical conductivity, thereby forming a resistive heater 32. Preferably, the heater 32 has a resistivity of a few hundred to a few thousand ohms. As described in more detail below, when an electric current flows through the heater 32, it uniformly heats the paddle section 20 which causes activation of the switch.

As shown in FIG. 3B, the resistive heater 32 is connected to underlying control and voltage supply lines by via structures 34 and 36, which are preferably formed from aluminum. Via 34 connects one side of the heater 32 to a metal conductor 38, and via 36 connects the other side of the heater 32 to a metal layer 40. In the preferred embodiment, the metal layer 40 also serves as the bottom wall of the Y-couplers 14 and the transverse waveguides $W_1$–$W_5$. The vias 34 and 36 are surrounded by an optically-transparent insulating layer 42, formed from materials such as SiC, SiN, or $Si_xO_yN_z$. The layer 42 also forms a transparent window between the optical cavity 22 and the Y-coupler 14. Preferably, metal conductor 38 is aluminum, and metal layer 40 is aluminum or gold.

With continued reference to FIG. 3B, the metal conductor 38 is formed on top of an insulating oxide layer 49. The oxide layer 49 separates the metal conductor 38 from underlying semiconductor switching circuitry formed in a silicon substrate 46. A via 48 connects the metal conductor 38 to the source electrode 50 of a semiconductor switching device on the substrate 46. A planarization oxide layer 44 covers the metal conductor 38 and separates it from the metal layer 40 above.

Figure 4:
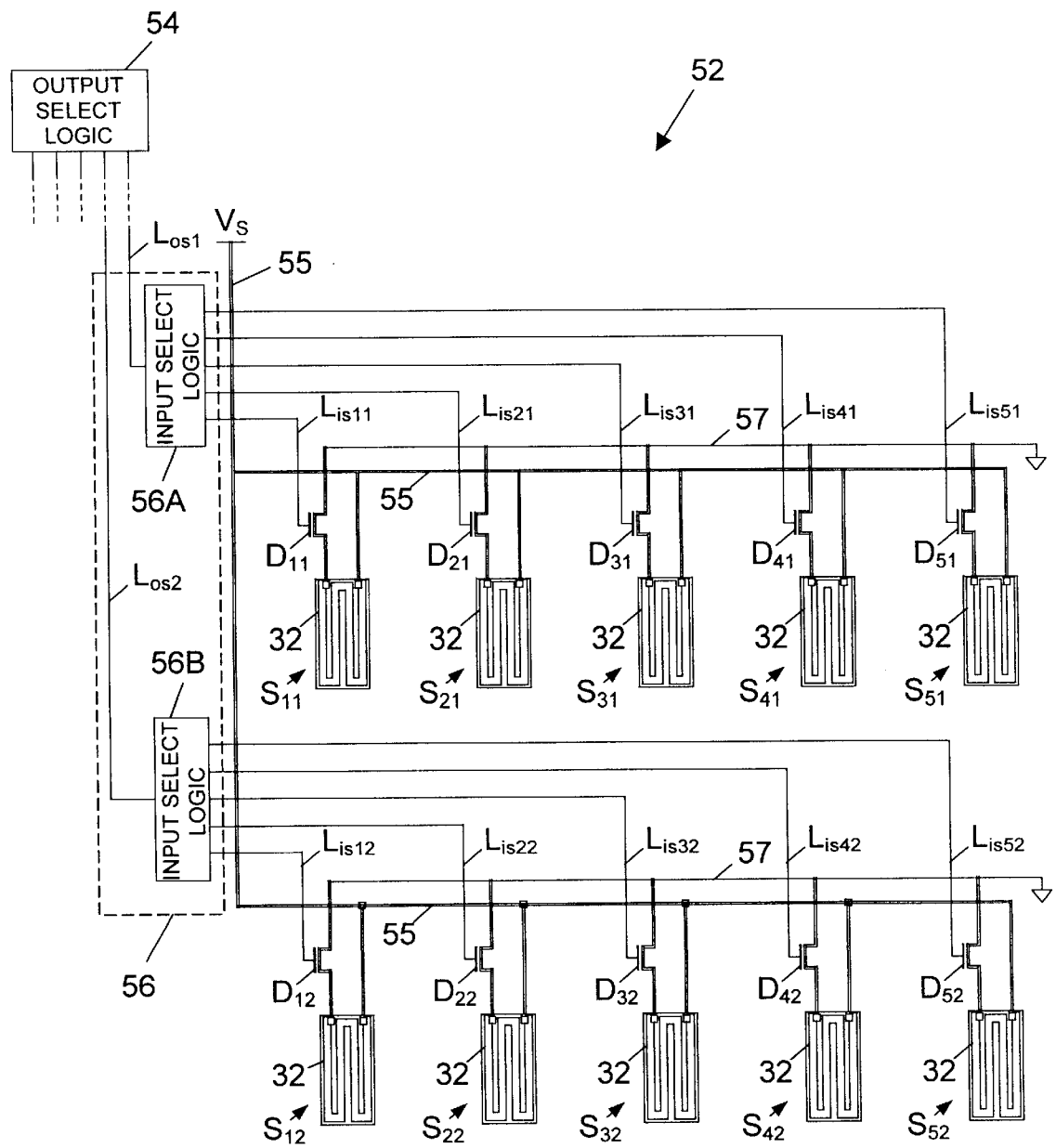
FIG. 4 is schematic diagram of a circuit for selectively activating individual switches of the optical switching device according to a preferred embodiment of the invention.

FIG. 4 depicts a preferred selection circuit 52 for selectively driving the heaters 32 to activate the switches $S_{11}$–$S_{55}$. The circuit 52 includes an output select logic circuit 54 and multiple input select logic circuits 56. Generally, the output select logic circuit 54 selects one or more rows of the switches $S_{11}$–$S_{55}$ associated with one or more of the output fibers $F_1$–$F_5$, and the input select logic circuits 56 select which of the switches $S_{11}$–$S_{55}$ within the selected row or rows are to be activated. The input select logic circuits 56 are connected to the output select logic circuit 54 by output select lines $L_{OS1}$–$L_{OS5}$, and the input select logic circuits 56 are connected to semiconductor switching devices $D_{11}$–$D_{55}$ by input select lines $L_{IS11}$–$L_{IS55}$. In the preferred embodiment, the semiconductor switching devices $D_{11}$–$D_{55}$ are CMOS transistor devices. So as not to unnecessarily complicate FIG. 4, only two input select logic circuits 56A and 56B and two sets of associated switches $S_{11}$–$S_{51}$ and $S_{12}$–$S_{52}$ are depicted. It should be appreciated that the other input select logic circuits 56 and associated switches $S_{13}$–$S_{53}$, $S_{14}$–$S_{54}$, and $S_{15}$–$S_{55}$ are configured according to the pattern depicted in FIG. 4.

As shown in FIG. 4, one side of each of the semiconductor switching devices $D_{11}$–$D_{55}$ is connected to the low side of an associated one of the resistive heaters 32. The other side of each of the semiconductor switching devices $D_{11}$–$D_{55}$ is connected to a common return bus 57. The high side of each of the resistive heaters 32 is connected to a DC supply voltage $V_s$, preferably 5–10 volts, through the supply bus 55.

As an example of the operation of the selection circuit 52, consider a situation in which it is desired to connect input fiber $F_{i1}$ with output fiber $F_{o2}$, and input fiber $F_{i2}$ with output fiber $F_{o1}$ (FIG. 1A). The output select logic circuit 54 generates an output select signal on the line $L_{OS1}$ having a 3-bit binary value, such as 010. The input select logic circuit 56A decodes the value 010 and sets the line $L_{IS21}$ high. When the line $L_{IS21}$ goes high, the switching device $D_{21}$ is turned on, thereby connecting the low side of the associated heater 32 to ground. With the circuit completed to ground, current flows through the heater 32 associated with the switch $S_{21}$, the heater 32 generates heat in the associated paddle 20, and the switch $S_{21}$ is activated.

An example of the operation of the bimorph switches $S_{11}$–$S_{55}$ is depicted in FIGS. 5A–5B which are somewhat simplified representations of cross-sectional portions of the switching device 10. As shown in FIG. 5A, which is a cross-sectional view taken at section line II—II, optical radiation is emitted from the end of the input optical fiber $F_{i1}$, collimated by lens $L_{i1}$ into a parallel beam, and directed across the top of the switches $S_{15}$ and $S_{14}$. Since neither of the switches $S_{15}$ or $S_{14}$ is selected, the optical beam continues uninterrupted past both switches $S_{15}$ and $S_{14}$. As shown in FIG. 1A, the beam is intercepted by the light detector $LD_1$.

As shown in FIG. 5B, which is a cross-sectional view taken at section line III—III, when a switch is selected, such as the switch $S_{35}$, an electrical current flows through the resistive heater 32 (FIGS. 2–4), and the bimorph structure of the paddle 20 is heated to <100° C. When the paddle 20 is heated, the various layers of the paddle 20 begin to expand. However, since the lower layer 24 possesses a higher coefficient of thermal expansion than does the upper layer 28, the lower layer 24 expands at a greater rate than does the upper layer 28, thereby creating differential stress across the bimorph structure. This causes the paddle 20 to bend upward, thereby raising the free end of the paddle by 10–20 microns or more. The raised paddle 20 intercepts the beam, and the optical radiation is reflected by the lower metal layer 24 into the optical cavity 22 beneath the paddle 20. As discussed above, the optical radiation propagates through the Y-coupler 14 and down the transverse waveguide $W_5$. As indicated in FIG. 5B, a selected switch, such as $S_{35}$ completely intercepts the beam in this embodiment of the invention. Thus, any one input beam is preferably directed to only a single one of the output fibers $F_{o1}$–$F_{o5}$ at any given time. However, a single one of the output fibers $F_{o1}$–$F_{o5}$ may carry optical radiation from multiple input fibers $F_{i1}$–$F_{i5}$.

One of the advantages of the preferred embodiment of the invention, as depicted in FIGS. 2, 3A, and 3B is a somewhat relaxed requirement on the positioning of the free end of the paddle 20. When a switch is not activated, the free end of the paddle 20 just needs to be positioned out of the beam path. When activated, the free end of the paddle 20 needs to get at least high enough to preferably intercept all of the optical radiation. Thus, the paddle 20 can be designed such that variations of several microns in the on or off position of the free end of the paddle 20 will not affect the operation of the switch.

Figure 6A:
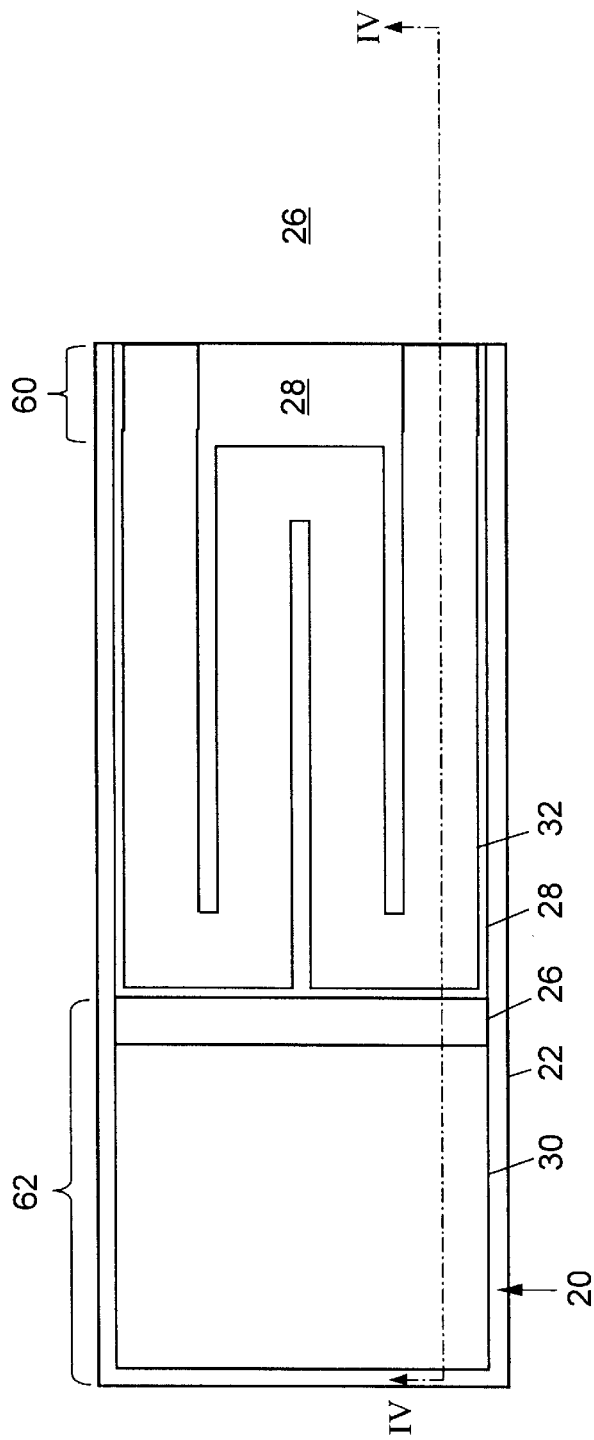
FIGS. 6A and 6B depict top and cross-sectional views of a paddle of a bimorph optical switch according to a preferred embodiment of the invention.
Figure 6B:
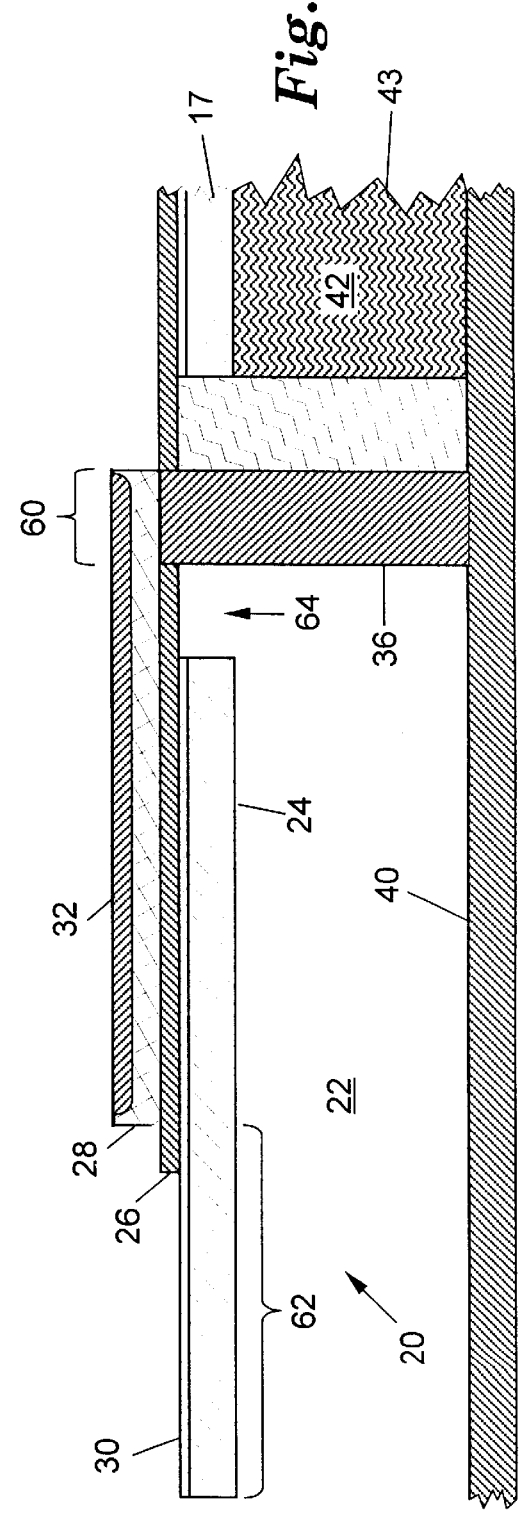

A preferred embodiment of the paddle structure is shown in FIGS. 6A–B. In this embodiment, the upper layer 28 and middle layer 26 do not extend to the full length of the paddle 20. Thus, the bonding and lower layers, 30 and 24, extend beyond the upper and middle layers by between one half and the same length as the bimetal bending section.

Figure 7A:
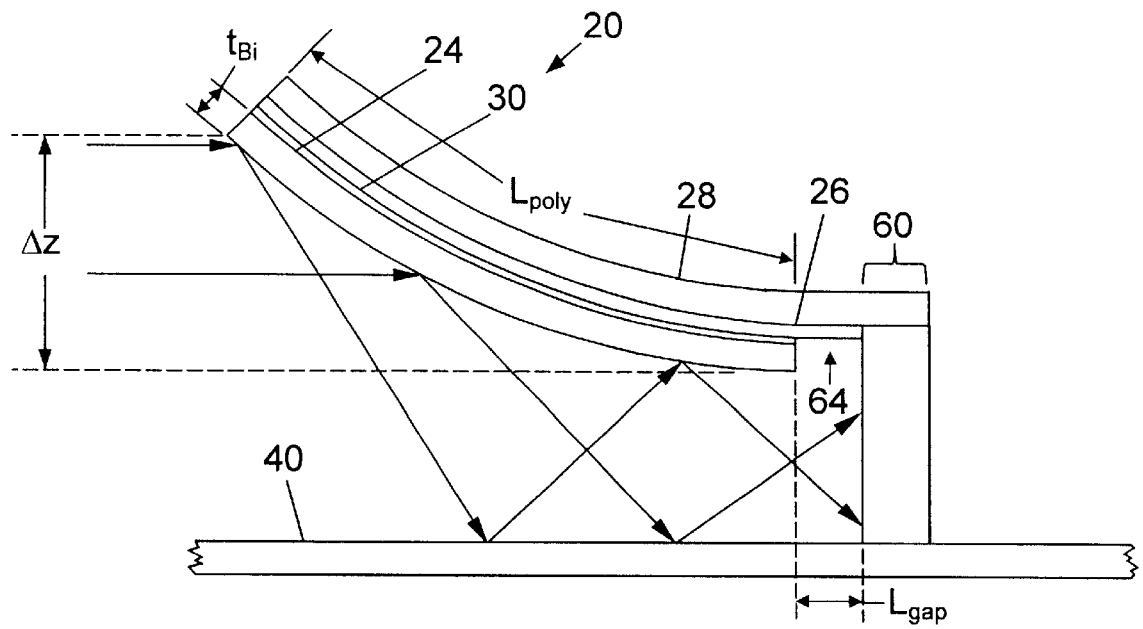
FIGS. 7A and 7B depict cross-sectional views of activated bimorph optical switches according e d embodiments of the invention.
Figure 7B:
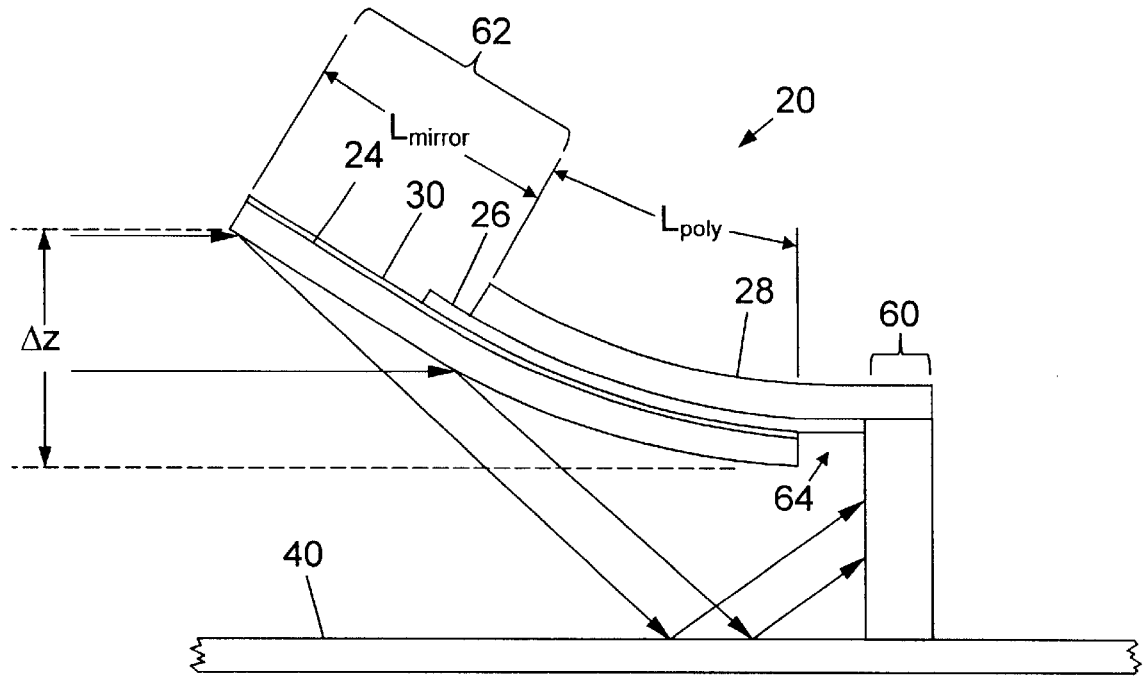

FIGS. 7A and 7B depict the two alternative embodiments of the paddle 20 of the bimorph optical switches in an activated position and intercepting an optical beam. In the embodiment of FIG. 7A, the upper layer 28 and the middle layer 26 extend to the full length of the paddle 20. With this embodiment, as the paddle 20 is heated, the difference in thermal expansion rates of the upper layer 28 and lower layer 30 cause the whole length of the paddle 20 to bend along a substantially continuous radius. As FIG. 7A indicates, since the upper edge of the optical beam is incident upon the paddle at a different angle than is the lower edge of the beam, the beam diverges when reflected from the paddle 20.

In the preferred embodiment of FIG. 7B, the mirror portion 62 of the lower layer 24 that intercepts the optical beam extends beyond the ends of the middle layer 26 and upper layer 28. As the paddle 20 is heated, only the section of the paddle 20 where the upper layer 28 and the lower layer 24 overlap bends due to the difference in thermal expansion rates. Thus, the mirror portion 62 remains relatively straight when the paddle 20 is heated. As FIG. 7B indicates, since the mirror portion 62 is substantially flat, the upper edge of the optical beam is incident upon the mirror portion 62 at about the same angle as the lower edge of the beam, such that the beam does not diverge when reflected from the mirror portion 62. Since the embodiment of FIG. 7B introduces less divergence of the optical radiation, it causes less temporal dispersion or spreading out of the radiation through the switch and waveguide sections, thereby allowing higher bandwidth switching than does the embodiment of FIG. 7A.

Another advantage of the embodiment of FIG. 7B is that the straight mirror portion 62 reduces the total number of reflections for the optical radiation, and maintains a similar and large angle of incidence and reflection for all the optical radiation travelling through the waveguide sections. This is significant since signal loss by scattering and absorption increases with the total number of reflections. Also, if the optical radiation strikes the surface of the waveguide structure at angles less than the critical angle, and the walls are composed of a dielectric material, then some of the radiation is transmitted through the walls leading to additional signal loss.

The manufacturing techniques used to fabricate the optical switching device 10 includes MEMS surface micromachining steps as well as standard silicon CMOS IC fabrication steps. Both the MEMS and CMOS fabrication processes have been designed to be compatible with, and transferable to, standard silicon foundries.

Figure 8A:
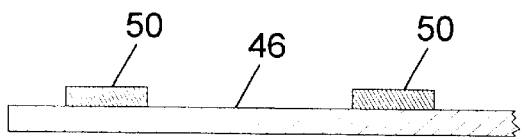
FIGS. 8A–8O are cross-sectional views indicating process steps for manufacturing the optical switching device according to a preferred embodiment of the invention.
Figure 8E:
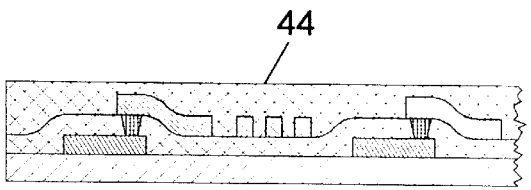
Figure 8B:
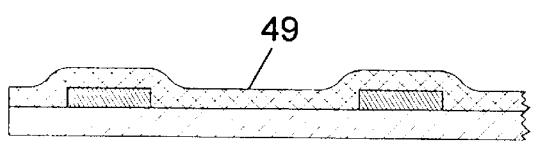
Figure 8F:
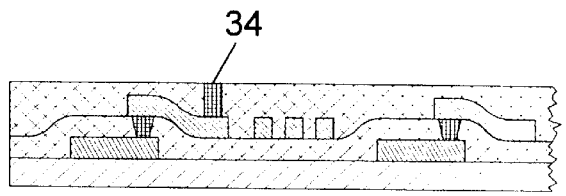
Figure 8C:
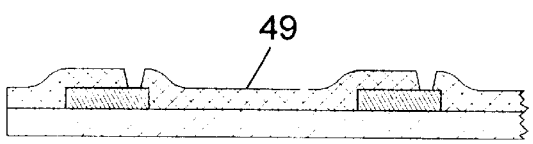
Figure 8G:
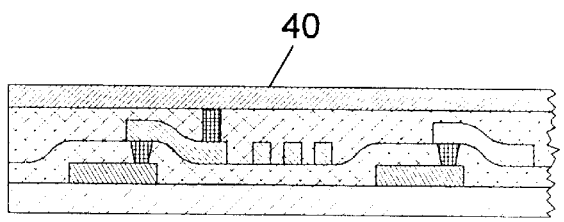
Figure 8D:
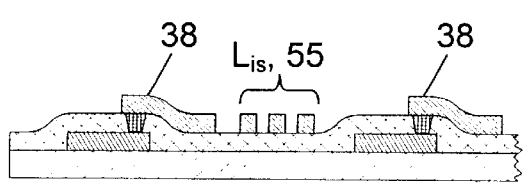
Figure 8H:
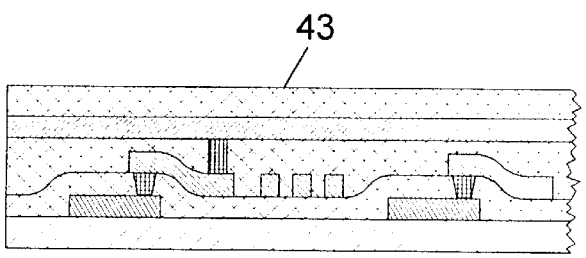
Figure 8I:
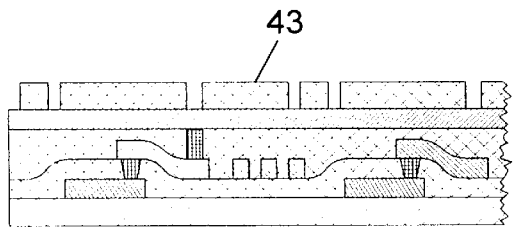
Figure 8L:
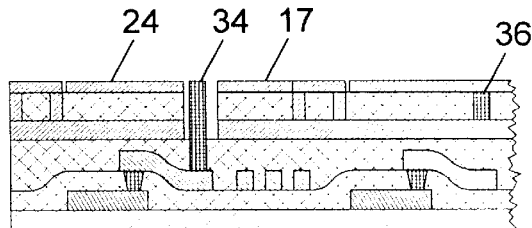
Figure 8J:
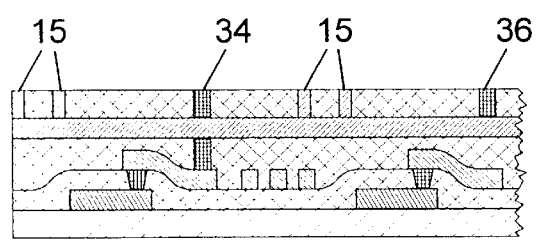
Figure 8M:
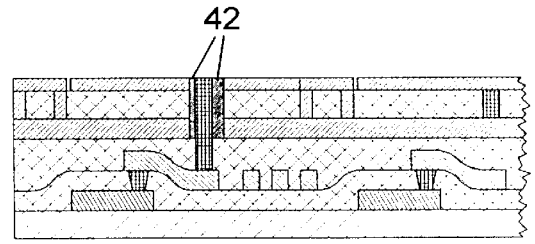
Figure 8K:
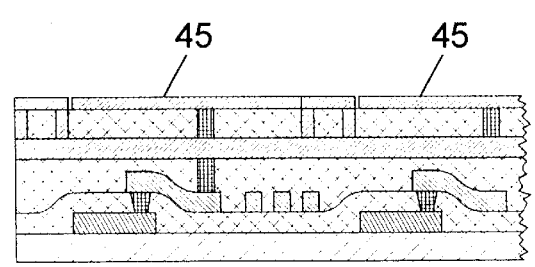
Figure 8N:
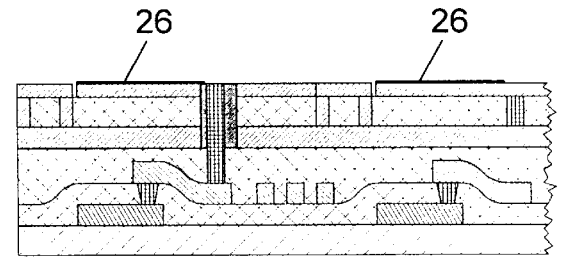
Figure 8O:
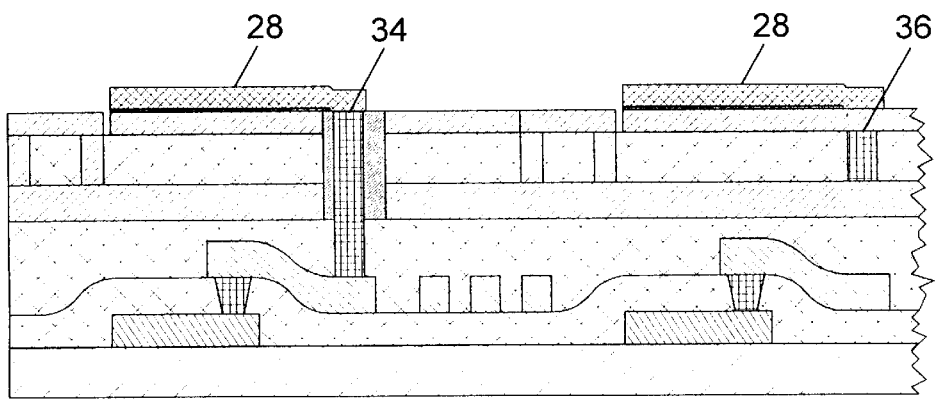

The various processing steps required to fabricate the complete structure shown in FIG. 3B are depicted in FIGS. 8A to 8O. The bottom layer shown in FIG. 8A is the base silicon wafer 46. The silicon wafer 46 is doped and insulating layers are added to produce conduction channels for the CMOS switching transistors. A metal layer is deposited and patterned on the wafer, and is used to define the transistor source electrode structures 50, as shown in FIG. 8A. This layer is usually about 1000 nanometers (nm) thick, and is preferably fabricated from aluminum or an aluminum alloy. A thermal or flowable oxide layer 49 is deposited on the wafer 46, as shown in FIG. 8B, and used to insulate the underlying electrical structures 50 from overlying metal interconnects. The thermal oxide layer 49, which is usually 800–1000 nm thick, is patterned and etched as shown in FIG. 8C, to provide the via 48 to connect the electrode structures 50 to overlying metal layers.

As shown in FIG. 8D, the fabrication continues with the deposition and patterning of a metal layer to form the conductors 38 and other circuit traces. This layer is usually 800–1000 nm thick, and is preferably fabricated from aluminum or an aluminum alloy. A 20 nm thick layer of Ti is usually added to suppress formation of hillocks. The metal layer is patterned to provide the conductors 38, the control signal lines $L_{is}$, and the $V_S$ supply bus 55. As shown in FIG. 8E, a second thermal oxide layer 44, preferably 2000–5000 nm thick, is deposited and planarized, such as by chemical mechanical polishing (CMP), to provide a flat surface upon which the switches $S_{11}$–$S_{55}$ and waveguide structures are fabricated. As shown in FIG. 8F, the oxide layer 44 is then patterned and the via 34 is fabricated to provide connection to the conductor 38. The metal layer 40 is then deposited to provide the base reflecting metal layer for the optical switch optical cavity 22, the lower waveguide surfaces for the Y-coupler 14 and the transverse waveguides $W_1$–$W_5$, and the return supply bus 57 for the resistive heating elements 32, as shown in FIG. 8G. The metal layer 40 is preferably 1000–3000 nm thick, and can be fabricated from Al or an Al alloy. The metal layers can also be fabricated from a number of different metals or semiconducting materials, with the primary requirement that the layers be electrically conductive.

FIGS. 8H depicts the deposition of a further thermal oxide layer 43. The oxide layer 43, which is preferably 1000–10000 nm thick, is used as the final release material in the formation of the optical switch cavity 22 under the switch paddle 20, and for the waveguide optical transmission material in the Y-coupler 14 and the transverse waveguides $W_1$–$W_5$. This layer 43 can also be fabricated from other materials, such as polymers, with the stipulation that it is highly transmissive to the optical radiation, and that it is compatible with the rest of the deposition and etching steps required to fabricate the complete switch and waveguide structures.

As shown in FIGS. 8I and 8J, the thermal oxide layer 43 is patterned to form trenches in which metal is deposited to form the vias 34 and 36 and the walls 15 of the Y-coupler 14 and the transverse waveguides $W_1$–$W_5$. The preferred metal is Al or an Al alloy. As shown in FIG. 8K, a top metal layer 45 is then deposited over the oxide layer 43, the vias 34 and 36, and the walls 15. As shown in FIG. 8L, the metal layer 45 is patterned and etched to provide the metal base layer 24 for the optical switches $S_{11}$–$S_{55}$ and the top cover layer 17 over the Y-coupler 14 and the transverse waveguides $W_1$–$W_5$. The layer 45 is preferably 500–5000 nm thick and made from Al, Au, or other electrically conductive materials, with the requirement that the material have a thermal expansion coefficient that is large relative to that of the upper layer 28.

As also shown in FIG. 8L, the structures around the via 34 are etched to form a trench. The trench is then filled with an electrically insulating material 42, as shown in FIG. 8M. The material 42 is transparent to the optical radiation, and is resistant to the final etch and paddle release processes described below. Preferably, the material 42 is silicon carbide, silicon nitride, or hydrogenated/oxygenated versions of these materials. The material 42 provides the electrical insulation to electrically isolate the vias 34 and 36 from the metal layer 45, and the via 34 from the metal layer 40. Further, the material 42 acts as an optical window and a barrier to prevent the final release etch material from entering the Y-coupler 14 and etching the optically-transmissive material therein (layer 43).

The next step is the deposition and patterning of the thin bonding metal layer 30. This metal may be 10–50 nm thick, and is preferably Ti, TiW, nichrome, or other material that will strongly bind the paddle lower metal layer 24 to the overlying electrical insulating layer 26. The following step, as shown in FIG. 8N, is the deposition and patterning of the thin electrically insulating layer 26 over the metal layers 24 and 30 of the switch paddle 20. This layer 26 is preferably 20–1000 nm thick, and is formed from silicon carbide, silicon nitride, or hydrogenated/oxygenated versions of these materials. The layer 26 electrically isolates the metal layers 24 and 30 from the polysilicon semiconducting top layer 28.

The final layer of the switch structure to be deposited and patterned is the doped polysilicon layer 28, as shown in FIG. 8O. The layer 28 covers the underlying metal and insulating layers of the switch paddle structure, and provides the electrical connection to the via 34. This layer 28 is also connected to the via 36 to complete the electrical circuit when the CMOS transistor switch $D_{11}$–$D_{55}$ is activated (FIG. 4). This layer is preferably 500–5000 mn thick and fabricated from polysilicon, or other materials, where the electrical conductivity of the material can be tailored to provide the desired electrical impedance to resistively heat the switch paddle structure to the temperature required to fully activate the switch $S_{11}$–$S_{55}$. Estimates for the required electrical impedance of the doped polysilicon layer 28 are discussed in more detail hereinafter.

The final processing step is indicated in FIG. 3B, where a wet or dry chemical or plasma etch process is used to etch the sacrificial oxide layer 43 under the switch paddle 20 to form the optical cavity 22. The etch process also releases the switch paddle 20, allowing the switches $S_{11}$–$S_{55}$ to be activated. The etchant used in this process should have a high etch rate for the release material in the cavity, but a low etch rate for the other exposed metals, insulating, and semiconducting materials. Preferably, liquid buffered HF or anhydrous HF vapor is used for this step.

Once the switch paddle 20 has been released, the switch and waveguide structures of the switching device may be bonded to a substrate, and input and output light sources or optical fibers and other optical components may be coupled to the switching device 10. The whole structure may also be coupled to a thermoelectric (TE) cooler which is used to stabilize the temperature of the switch and keep the switch paddle 20 out of the optical beam path when the switches $S_{11}$–$S_{55}$ are not activated.

Some of the important physical parameters affecting the operation of the thermally-activated bimorph switch of the present invention include (1) the thermal time constant, $\tau_{th}$, of the bi-material switching element, which determines the fastest switching time for a given set of switch design parameters, and which is dependent on the material properties and dimensions of the thin film structures; (2) the temperature, $T_{MAX}$, required to fully activate the switch to intercept the optical radiation, which depends on the positional responsivity of the bimorph structure along with the maximum displacement of the free end of the paddle 20 required to intercept the optical radiation beam; (3) the maximum power, $P_{MAX}$, required to heat the bimorph structure to cause the free end of the paddle 20 to fully intercept the optical beam, which should be minimized to reduce switch thermal management problems; and (4) the supply voltage, $V_s$, required to provide $P_{MAX}$.

As discussed in more detail below, there is also a maximum temperature rise within the bimorph structure which constrains the design. The material properties of the thin films of which the switch is comprised limit the maximum temperature to which these materials can be exposed over extended periods of time and number of switching operations before significant performance degradation and switch failure can be expected.

Figure 9:
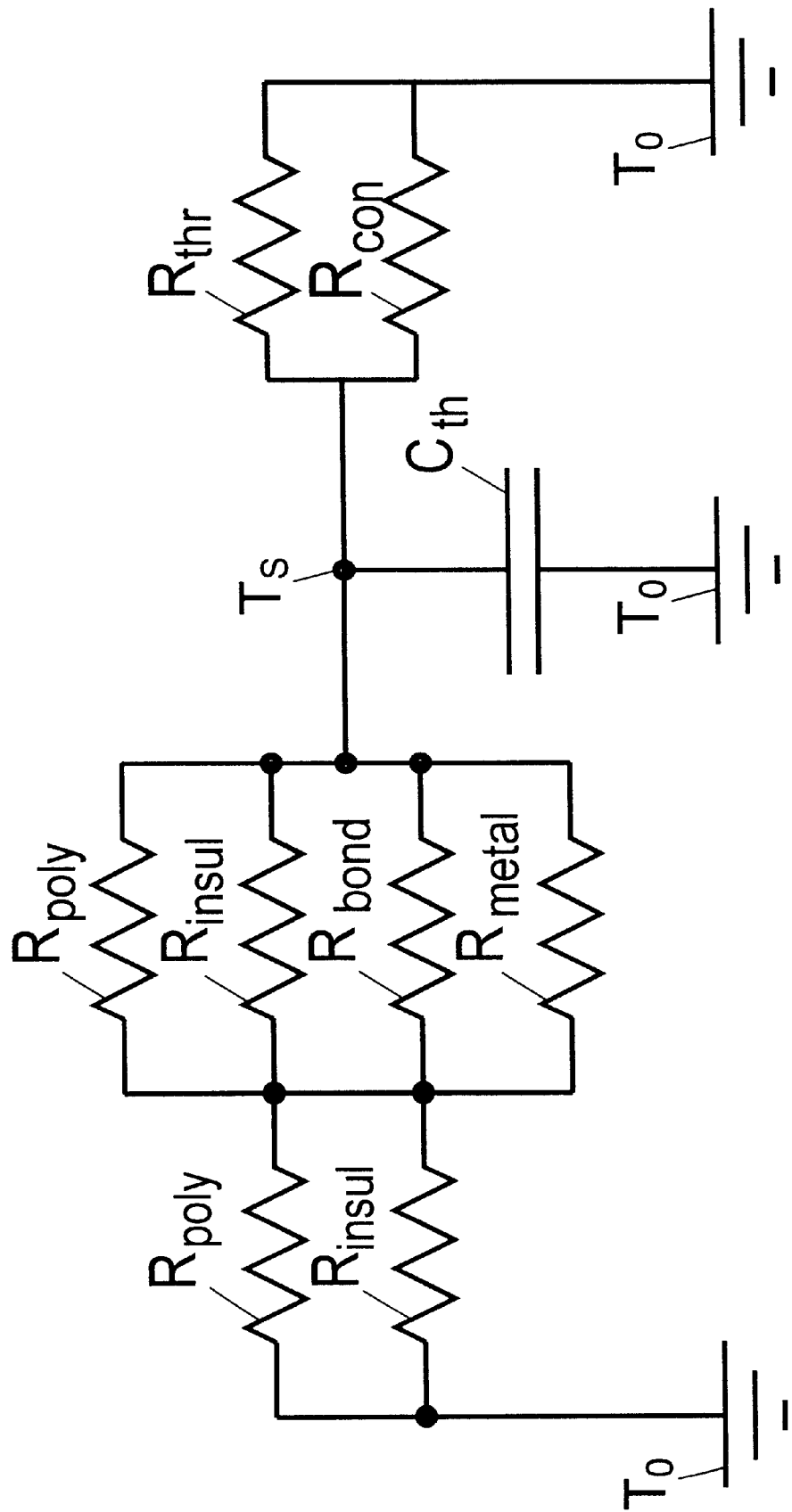
FIG. 9 is a schematic diagram of an equivalent thermal circuit of a bimorph optical switch according to a preferred embodiment of the invention.

The thermal response of the switch can be analyzed using the equivalent thermal circuit given in FIG. 9. In a gas-filled switch enclosure, the radiation thermal resistance $R_{thr}$ and the conduction and convective thermal impedances $R_{con}$ shown in FIG. 9 are negligible in comparison with the thermal losses through the switch support structure, and are therefore neglected in the following analysis. The thermal time constant $\tau_{th}$ of the switch element controls the speed at which the switch can both be activated and switched off. The faster the rate of increase and decrease in the switch paddle temperature, the more quickly the paddle 20 moves to intercept or unblock the optical radiation. The thermal time constant $\tau_{th}$ is determined by the thermal capacitance $C_{th}$ and the thermal impedance $R_{th}$ of the switch paddle structure according to:

$$\tau_{th} = R_{th} \times C_{th}. \tag{1}$$

The thermal capacitance $C_{th}$ of the switch is determined by the capacities of the individual thin film structures which make up the switch paddle 20 shown in FIG. 3B. The thermal capacitance of a specific thin film layer $C_{th}(i)$ is determined according to:

$$C_{th}(i) = \rho(i) \times \lambda(i) \times t(i) \times l(i) \times w(i), \tag{2}$$

where $\rho(i)$ is the density, $\lambda(i)$ is the specific heat, $t(i)$ the thickness, $l(i)$ the length, and $w(i)$ the width of the specific layer. The lumped thermal capacitance of the switch paddle 20 is the sum of all the individual layer capacitances, i.e.:

$$C_{th} = \sum_i C_{th}(i). \tag{3}$$

Likewise, the thermal impedance of the switch is controlled by the thermal conductivity of the paths to the substrate through the switch structure. The thermal impedance for a path (i) is as follows:

$$R_{th}(i) = \frac{l(i)}{2 \times \kappa(i) \times t(i) \times w(i)}, \tag{4}$$

where $\kappa(i)$ is the thermal conductivity of the conduction path. The total conductive thermal impedance $R_{th}$ to the interconnects and metal vias, and thus to the silicon substrate, is given by the following equation for the structure shown in FIG. 6B:

$$R_{th} = \left(\frac{1}{R_{\text{poly}}} + \frac{1}{R_{\text{insul}}}\right)^{-1} + \left(\frac{1}{R_{\text{poly}}} + \frac{1}{R_{\text{insul}}} + \frac{1}{R_{\text{bond}}} + \frac{1}{R_{\text{metal}}}\right)^{-1} \tag{5}$$

where, as shown in FIG. 9, the thermal impedance of the polysilicon $R_{poly}$ is in parallel with the insulating layer $R_{insul}$ for the section closest to the switch substrate and is in series with the section containing the parallel thermal impedances $R_{poly}$, $R_{insul}$, the bonding metal layer $R_{bond}$, and the bimetal layer $R_{metal}$. In this analysis, the thermal impedances of the lower layer 24 and bonding layer 30 of the paddle 20 shown in FIG. 6B are assumed to be negligible in comparison with the other layers, as layers 24 and 30 are composed of high thermal conductivity metals. The overlapping insulation layer 26 is physically small such that it also makes a negligible contribution to the switch thermal impedance.

The thermal properties of several materials that are preferred for use in the invention are shown in Table I. The materials properties shown in Table I are not necessarily accurate values for the thin films used in the fabrication of the switch as they are, in most cases, bulk material properties, which can be significantly different from the thin film values, depending the film thickness and fabrication technique. Nevertheless, they can be used in the present calculations to estimate the dependence of the switch parameters on these materials. The electrical impedances of the insulator materials are not included in the tables as they, being very large, have no bearing on the calculation results presented in Table II below.

The results of several example calculations of the thermal response time for a given switch size and paddle thickness are shown in Table II. It should be appreciated that there are many possible combinations of materials and switch physical dimensions, with the optimum combination dependent on the particular switching application.

TABLE I

| | Thermal Expansion Coefficient ($10^{-6}$ K$^{-1}$) | Thermal Conductivity (W/m-K) | Specific Heat (J/g-K) | Young's Modulus ($10^{11}$ N/m$^2$) | Density (g/cm$^3$) | Intrinsic Resistivity ($\Omega \cdot$ cm) |
|---|---|---|---|---|---|---|
| Semi-conductor | | | | | | |
| Polysilicon | 4.7 | 33.2 | 0.702 | 1.9 | 2.33 | $1 \times 10^5$ |
| Insulators | | | | | | |
| SiO$_2$ | 0.55 | 1.4 | 0.17 | 0.73 | 2.65 | |
| SiC | 3.5 | 2.1 | 0.17 | 7.0 | 3.21 | |
| A—H$_x$Si$_y$C$_z$ | 5 | 0.34 | 0.17 | 0.7 | 3.2 | |
| Si$_3$N$_4$ | 0.8 | 19 | 0.17 | 3.85 | 3.17 | |
| Bimetals | | | | | | |
| Al | 25.0 | 237 | 0.897 | 0.70 | 2.70 | $2.65 \times 10^{-8}$ |
| Au | 14.2 | 317 | 0.129 | 0.8 | 19.3 | $2.27 \times 10^{-8}$ |
| Zn | 35.0 | 116 | 0.388 | 0.79 | 7.13 | $5.5 \times 10^{-8}$ |
| Pb | 28.9 | 35 | 0.129 | 0.16 | 11.3 | $20 \times 10^{-8}$ |
| Bonding Metals | | | | | | |
| Cr | 4.9 | 93.7 | 0.449 | 1.52 | 7.15 | $12.7 \times 10^{-8}$ |
| Ti | 8.6 | 21.9 | 0.523 | 1.2 | 4.51 | $39 \times 10^{-8}$ |
| W | 4.5 | 174 | 0.116 | 4.1 | 19.3 | $5.4 \times 10^{-8}$ |
| TiW | 6 | 14.4 | 0.21 | 3.5 | 16.3 | $10 \times 10^{-8}$ |
| Ni | 13.4 | 90.7 | 0.444 | 2.1 | 8.9 | $6.9 \times 10^{-8}$ |
| nichrome | 10 | 12 | 0.445 | 2.1 | 8.5 | $11 \times 10^{-8}$ |

TABLE II

| Parameter | Symbol | Design a1 | Design a2 | Design b1 | Design b2 | Units |
|---|---|---|---|---|---|---|
| Tip excursion | $z_{mae}$ | 15 | 15 | 15 | 15 | $\mu$m |
| Total Paddle length | $L_{paddle}$ | 150 | 200 | 150 | 200 | $\mu$m |
| Paddle width | $W_{paddle}$ | 20 | 20 | 20 | 20 | $\mu$m |
| Length polysilicon | $L_{poly}$ | 150 | 200 | 100 | 150 | $\mu$m |
| Length bimetal region | $L_{metal}$ | 150 | 200 | 50 | 150 | $\mu$m |
| Length thermal gap | $L_{gap}$ | 0 | 0 | 0 | 0 | $\mu$m |
| Length of straight mirror | $L_{mirror}$ | 0 | 0 | 50 | 50 | $\mu$m |
| Thickness of bimetal | $t_{meal}$ | 0.5 | 0.3 | 0.5 | 0.3 | $\mu$m |
| Thickness of Bonding metal | $T_{bond}$ | 0.01 | 0.01 | 0.01 | 0.01 | $\mu$m |
| Thickness of polysilicon | $t_{poly}$ | 0.5 | 0.3 | 0.5 | 0.3 | $\mu$m |
| Thickness of insulator | $t_{insul}$ | 0.02 | 0.01 | 0.01 | 0.01 | $\mu$m |
| Supply voltage | $V_R$ | 5 | 5 | 5 | 5 | V |
| Switch base temperature | $T_0$ | 300 | 300 | 300 | 300 | K |
| Calculated Results | | | | | | |
| Switch thermal impedance | $R_{th}$ | $3.5 \times 10^3$ | $7.8 \times 10^3$ | $3.9 \times 10^3$ | $8.5 \times 10^3$ | K/watt |
| Switch thermal capacitance | $C_{th}$ | $7.2 \times 10^{-8}$ | $5.9 \times 10^{-8}$ | $6.9 \times 10^{-8}$ | $5.7 \times 10^{-8}$ | J/K |
| Thermal time constant | $\tau_{th}$ | 0.26 | 0.46 | 0.27 | 0.48 | msec |
| Responsivity | $R_T$ | 0.30 | 0.9 | 0.20 | 0.68 | $\mu$m/K |
| Change in temperature | $\Delta T$ | 49 | 17 | 74 | 22 | K |
| Thermal power | $P_{th}$ | 0.87 | 0.134 | 1.17 | 0.16 | Watt |
| Electrical Impedance | $R_{Si}$ | $2.9 \times 10^4$ | $4.0 \times 10^4$ | $2.1 \times 10^4$ | $3.2 \times 10^4$ | $\Omega$ |
| Polysilicon resistivity | $\sigma_{Si}$ | 28 | 45 | 25 | 42 | $(\Omega \cdot cm)^2$ |

The vertical displacement $\Delta z$ of the free end of the switch paddle 20, as shown in FIGS. 7A–B, must be great enough such that the paddle 20 fully intercepts all the free space optical radiation that is projected across the top of the switch structure. The vertical movement of the paddle 20 is dependent on the change in temperature $\Delta T$ of the bimorph structure, and the switch responsivity $R_p$ in units of microns/° C. The responsivity $R_p$ determines the sensitivity, and for the switch structure shown in FIG. 7A, can be found from the following relation:

$$R_p = \frac{\Delta z}{\Delta T} = \frac{3 \times (\Delta l^2) \times (\alpha_{bi} - \alpha_{Si}) \times (1 + x)}{t_{bi} \times K}, \quad (6)$$

where $\Delta l = (L_{poly} - L_{gap})$, $L_{poly}$ is the length of the paddle 20 where the polysilicon and bimetal layers overlap, and $L_{gap}$ is the length of the thermal isolation gap 64 shown in FIG. 7A. Also, $t_{bi}$ is the thickness of the bimetal layer 24, $\alpha_{bi}$ and $\alpha_{si}$ are the thermal expansion coefficients of the bimetal layer 24 and the polysilicon layer 28, respectively, and x the ratio of the thicknesses of the polysilicon layer 28 and the bimetal layer 24, i.e.

$$x = \frac{t_{Si}}{t_{bi}}. \quad (7)$$

The term K is a correction factor necessitated by the difference in Young's moduli of the two layers 24 and 28, i.e.:

$$K = 4 + 6x + 4x^2 + nx^3 + \frac{1}{nx}. \quad (8)$$

The term n in equation (8) is the ratio of the Young's moduli, i.e.:

$$n = \frac{E_{Si}}{E_{bi}}, \quad (9)$$

where $E_{Si}$ and $E_{bi}$ are the Young's moduli of the polysilicon layer 28 and the bimetal layer 24, respectively.

For the switch structure shown in FIG. 7B, the responsivity is determined according to:

$$R_p = \frac{\Delta z}{\Delta T} = \left(1 + \frac{L_{paddle}}{L_{poly} - L_{gap}}\right) \times \left(\frac{3 \times (L_{poly} - L_{gap})^2}{t_{bi}}\right) \times (\alpha_{bi} - \alpha_{Si}) \times \left(\frac{1+x}{K}\right) \quad (10)$$

where $L_{gap}$ is the length of the thermal isolation gap 64, $L_{paddle}$ is the total length of the paddle 20, i.e., $L_{poly}+L_{mirror}$, where $L_{mirror}$ is the length of the mirror portion 62 of the lower layer 24.

Once the maximum tip displacement $z_{max}$ that is required to fully intercept the optical radiation is known, the maximum change in temperature $T_{max}$ of the bimorph structure required to achieve this displacement can be found according to:

$$T_{max} = \frac{z_{max}}{R_p}. \quad (11)$$

After the switch is activated, and heat is applied to the switch paddle 20, there is a time lag before the switch paddle 20 reaches its final optical beam path intercept position. This is due to the finite time required to heat the structure to its final operating temperature which is a function of the thermal time constant $\tau_{th}$ calculated earlier (Eq. 1). The time dependence of the temperature rise when the switch is activated, and fall after the switch has been turned off, T(t), is determined according to:

$$T(t) = T_{max} \times (1 - e^{-t/\tau_{th}}). \quad (12)$$

The maximum operating switch temperature $T_{max}$ should be low enough that the switch does not experience long term performance degradation due to, for example, heat induced stress gradients in the paddle structure, or fatigue and ion mobility issues in the thin film structures. These issues become problems for standard CMOS IC devices at temperatures much in excess of 100° C. This is well above the expected operating temperature of the switch of the present invention. (See Table II.)

Once the maximum switch operating temperature and time dependence have been found, the position of the tip of the paddle 20 and the estimated time required for the paddle 20 to be in position to fully intercept the optical radiation can be calculated according to:

$$z(t) = R_p \times T(t). \quad (13)$$

Figure 10:
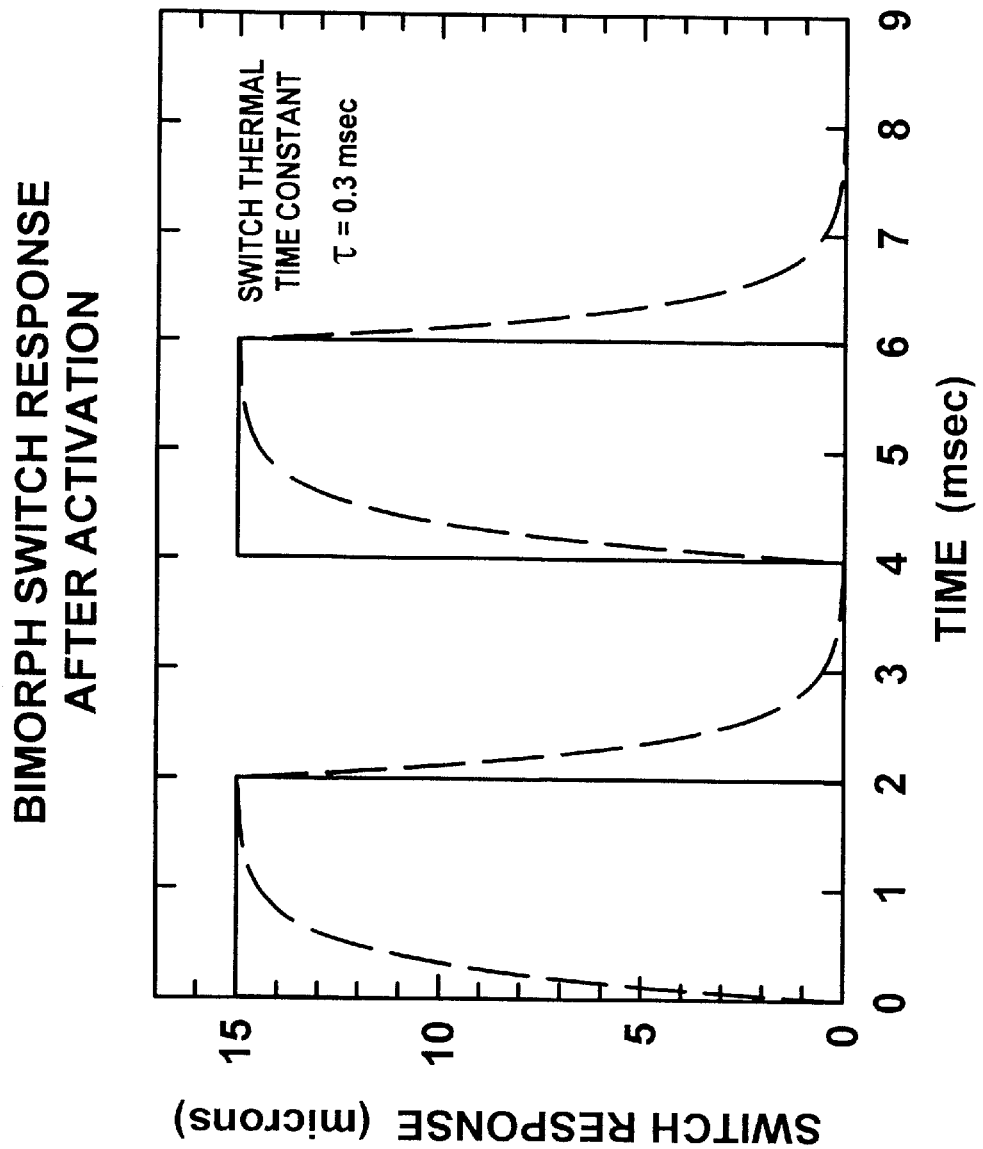
FIG. 10 is a graph depicting the modeled response time of a bimorph optical switch according to a preferred embodiment of the invention.

A graph of the tip position of the switch paddle 20 versus time is shown in FIG. 10, where the switch thermal time constant $\tau_{th}$ is assumed to be 300 microseconds. In this situation, the switch is fully activated after approximately 1 millisecond. The switch returns to its fully off position after the same time interval. The switch can be designed to have a thermal time constant $\tau_{th}$ in the range from several tens of microseconds to seconds, depending on the switching application (e.g. switch size, required paddle movement, materials, design, and power dissipation) as shown in Table II.

As mentioned previously, an important design consideration is thermal power management, both from a power usage requirement, and switch temperature stability and heat dissipation requirements. The heating power $P_{max}$ required to raise the switch to its operating temperature $T_{max}$ is given by the following expression:

$$P_{max} = \frac{T_{max}}{R_{th}}, \quad (14)$$

where $R_{th}$ is the thermal impedance of the structure of the switch paddle 20. Knowing the switch supply voltage $V_S$. it is possible to estimate the electrical impedance $RE_{poly}$ of the polysilicon resistive heater 32 required to achieve the switch operating temperature according to:

$$RE_{poly} = \frac{V_S}{P_{max}}. \quad (15)$$

The required electrical conductivity $\sigma_{poly}$ any of the polysilicon resistive heater 32 can be found according to:

$$\sigma_{poly} = \frac{2 \times L_{poly}}{RE_{poly} \times t_{poly} \times w_{poly}}. \quad (16)$$

Patterning the polysilicon thin film layer 28 as shown in FIG. 6A, and doping the patterned layer 28 using ion implantation techniques, allows the resistivity of the polysilicon layer 28 to be tailored to the desired value. Typical calculations for switch designs, thermal time constants, and maximum operating temperature are shown in Table II.

Several calculations of the switch performance, depending on the specific switch structure and total length of the switch paddle 20, are shown in Table II. Designs a1 and a2 refer to the switch design shown in FIG. 7A, while designs b1 and b2 refer to the switch structure shown in FIG. 7B. Designs a1 and b1 are 150 micron long structures, and designs a2 and b2 are 200 micron long structures. These calculations show that as the length of the paddle 20 increases, the thermal time constant (and hence the switch activation time) also increases, but the temperature, and thus the power required to activate the switch correspondingly, decreases. The switching time and power requirements are also significantly dependent on the other input parameters listed in Table II, along with the thermal and mechanical properties (shown in Table I) of the of the materials of which the switch is composed.

The differences in response time and temperature requirements of the two different embodiments shown in FIGS. 7A and 7B result from the following: Since the length of the bimetal section (where the upper layer 28 and the lower layer 24 overlap) is considerably shorter in the embodiment of FIG. 7B, the bending angle of the bimetal section must be greater to intercept the optical radiation. This is achieved with a larger change in temperature in the bimetal structure. Although the time constant and power requirements are larger for the FIG. 7B embodiment in comparison with the FIG. 7A embodiment, the advantage of the FIG. 7B embodiment is that the optical radiation is reflected off the mirror portion 62 of the lower layer 24 with minimal divergence, leading to smaller temporal dispersion and refractive losses within the switch and the waveguide structures.

It is contemplated, and will be apparent to those skilled in the art from the preceding description and the accompanying drawings that modifications and/or changes may be made in the embodiments of the invention. Accordingly, it is expressly intended that the foregoing description and the accompanying drawings are illustrative of preferred embodiments only, not limiting thereto, and that the true spirit and scope of the present invention be determined by reference to the appended claims.

What is claimed is:

1. An optical switch for selectively transferring optical radiation from a first optical path to a second optical path, comprising:
    an input optical structure for receiving the optical radiation from the first optical path and for directing the optical radiation along a propagation path;
    a paddle disposed adjacent the propagation path, the paddle having a fixed portion and a free end, and operable to bend upon a change in temperature, thereby moving the free end between a first position where the free end does not intercept the optical radiation and a second position where the free end intercepts and redirects the optical radiation, wherein the paddle includes:
        an upper layer having a first coefficient of thermal expansion; and
        a lower layer mechanically coupled to the upper layer, and having a second coefficient of thermal expansion that is different from the first coefficient of thermal expansion,
        where the change in temperature causes the upper and lower layers to change in size at different rates due to the differences in coefficients of thermal expansion, thereby creating stress in the paddle and causing the paddle to bend; and
    an output optical structure for receiving the optical radiation from the paddle and for directing the optical radiation along the second optical path.

2. The optical switch of claim 1 wherein the upper layer includes a resistive heater portion that generates heat upon passage of an electric current there through.

3. The optical switch of claim 2 further comprising an electrically-insulating layer disposed between the upper and lower layers.

4. The optical switch of claim 3 wherein the electrically-insulative layer is a material selected from the group consisting of $SiO_2$, SiC, $Si_3N_4$, $Si_xO_yN_z$, and $H_xSi_yC_z$.

5. The optical switch of claim 3 further comprising a bonding layer disposed between the electrically-insulative layer and the lower layer.

6. The optical switch of claim 5 wherein the bonding layer is a material selected from the group consisting of Cr, Ti, TiW, TiN, nichrome, and alloys thereof.

7. The optical switch of claim 1 wherein the lower layer has a coefficient of thermal expansion greater than that of the upper layer.

8. The optical switch of claim 7 wherein the lower layer is an optically-reflective metal.

9. The optical switch of claim 8 wherein the lower layer is a metal selected from the group consisting of Au, Al, Pb, and Zn.

10. The optical switch of claim 1 wherein the upper layer is doped polysilicon having a coefficient of thermal expansion less than that of the lower layer.

11. The optical switch of claim 1 wherein the upper layer is disposed only between the fixed portion of the paddle and a point located between the fixed portion and the free end, whereby a portion of the lower layer extends beyond the upper layer at the free end of the paddle.

12. The optical switch of claim 11 wherein the portion of the lower layer extending beyond the upper layer comprises a mirror portion that remains substantially flat when the free end of the paddle is in the second position, such that the mirror portion reflects the optical radiation with minimal beam divergence.

13. The optical switch of claim 1 further comprising a thermal isolation gap portion adjacent the fixed portion of the paddle, where in the thermal isolation gap portion, the lower layer of the paddle does not overlap the upper layer.

14. An optical switch for selectively transferring optical radiation from a first optical path to a second optical path, comprising:
    an input optical structure for receiving the optical radiation from the first optical path and for directing the optical radiation along a propagation path, the input optical structure including:
        an input optical fiber for emitting the optical radiation; and
        a lens for receiving the optical radiation from the input optical fiber, and for collimating the optical radiation into an optical beam propagating along the propagation path;
    a paddle disposed adjacent the propagation path, the paddle having a fixed portion and a free end, and operable to bend upon a change in temperature, thereby moving the free end between a first position where the free end does not intercept the optical radiation and a second position where the free end intercepts and redirects the optical radiation, the paddle for intercepting the optical beam when the free end is in the second position, and for reflecting the optical beam into an output optical structure; and
    the output optical structure for receiving the optical radiation from the paddle and for directing the optical radiation along the second optical path.

15. The optical switch of claim 14 further comprising an optical cavity disposed adjacent the paddle for receiving the optical radiation reflected from the paddle.

16. The optical switch of claim 15 wherein the optical cavity is enclosed by walls that are reflective to the optical radiation received by the cavity.

17. The optical switch of claim 16 wherein at least some of the walls are formed of metal selected from the group consisting of Au, Al, Pb, and Zn.

18. The optical switch of claim 15 further comprising an optically transparent window forming at least one wall of the optical cavity, the optically transparent window for receiving the optical radiation from the optical cavity.

19. The optical switch of claim 18 wherein the optically transparent window is composed of an optically transparent and etch-resistant material selected from the group consisting of SiC, $Si_3N_4$, and $H_xSi_yC_z$.

20. The optical switch of claim 18 wherein the output optical structure further comprises:

an optical waveguide Y-coupler adjacent the optically transparent window for receiving and redirecting the optical radiation reflected from the paddle; and a transverse optical waveguide for receiving the optical radiation from the Y-coupler and for conveying the optical radiation in a direction substantially perpendicular to the propagation path.

21. The optical switch of claim 20 wherein the optical waveguide Y-coupler and the transverse optical waveguide have a thermal oxide interior material.

22. The optical switch of claim 21 wherein the thermal oxide interior material is silicon dioxide ($SiO_2$).

23. The optical switch of claim 20 wherein the optical waveguide Y-coupler and the transverse optical waveguide have a polymeric interior material which provides high optical transmission for the optical radiation.

24. The optical switch of claim 21 wherein the optical waveguide Y-coupler and the transverse optical waveguide have walls formed by a wall material having an index of refraction less than the thermal oxide interior material.

25. The optical switch of claim 21 wherein the optical waveguide Y-coupler and the transverse optical waveguide have walls formed by a wall material having an index of refraction greater than the thermal oxide interior material.

26. The optical switch of claim 25 wherein the wall material is a metal selected from the group consisting of Au, Al, Pb, and Zn.

27. The optical switch of claim 20 further comprising:

an output optical fiber for conveying the optical radiation along the second path; and an output optical coupler for connecting the transverse optical waveguide to the output optical fiber, and for coupling the optical radiation from the transverse optical waveguide into the output optical fiber.

28. An optical switching device for selectively transferring at least one optical signal from at least one optical input to M number of output optical channels, comprising:

an input optical structure for receiving the at least one optical signal from the at least one optical input selected from a group consisting of an optical fiber, a modulated laser light source, and a modulated light-emitting diode light source, and for directing the at least one optical signal along a propagation path; and a 1×M-dimensional array of optical switches, comprising:

M number of selectively-activated paddles that are adjacent to and in parallel with the propagation path, each of the paddles having a fixed portion and a free end, and operable to bend upon a change in temperature, thereby moving the free end between a first position where the free end does not intercept the optical signal and a second position where the free end intercepts the optical signal, where the paddles are selectively activated to bend, intercept the optical signal, and redirect the optical signal; and M number of output optical structures, each optically coupled to a corresponding one of the M number of paddles for receiving the optical signal from the corresponding one of the paddles and for directing the optical signal along a corresponding one of the M number of output optical channels.

29. An optical switching device for selectively transferring at least one optical signal from at least one optical input to M number of output optical channels, comprising:

N number of input optical structures for receiving N number of optical signals from N number of optical inputs and for directing the N number of optical signals along N number of propagation paths; and N number of 1×M-dimensional arrays arranged collaterally and in parallel, each of the N number of the 1×M-dimensional arrays aligned with a corresponding one of the N number of propagation paths, each of the 1×M-dimensional arrays comprising:

M number of selectively-activated paddles that are adjacent to and in parallel with the propagation path, each of the paddles having a fixed portion and a free end, and operable to bend upon a change in temperature, thereby moving the free end between a first position where the free end does not intercept the optical signal and a second position where the free end intercepts the optical signal, where the paddles are selectively activated to bend, intercept the optical signal, and redirect the optical signal; and M number of output optical structures, each optically coupled to a corresponding one of the M number of paddles for receiving the optical signal from the corresponding one of the paddles and for directing the optical signal along a corresponding one of the M number of output optical channels; and M number of transverse waveguides corresponding to the M number of output optical structures of each 1×M-dimensional array, each of the transverse waveguides optically coupled to a corresponding one of the output optical structures on each of the 1×M-dimensional arrays, and for directing one or more of the optical signals along a corresponding one of the M number of output optical channels.

30. The optical switching device of claim 29 wherein each 1×M-dimensional array of optical switches is operable to direct a corresponding one of the optical signals to any one of the M number of output optical channels.

31. The optical switching device of claim 29 operable to direct more than one of the N number of optical signals to any one of the M number of output optical channels.

32. The optical switching device of claim 29 formed on a monolithic semiconductor integrated circuit substrate.

* * * * *